US010308760B2

(12) United States Patent
Sasaki

(10) Patent No.: US 10,308,760 B2
(45) **Date of Patent: *Jun. 4, 2019**

(54) POLYCARBONATE RESIN COMPOSITION AND MOLDED ARTICLE

(75) Inventor: Haruo Sasaki, Fukuoka (JP)

(73) Assignee: MITSUBISHI CHEMICAL CORPORATION, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/618,368

(22) Filed: Sep. 14, 2012

(65) Prior Publication Data

US 2013/0012628 A1 Jan. 10, 2013

Related U.S. Application Data

(63) Continuation of application No. PCT/JP2011/057347, filed on Mar. 25, 2011.

(30) Foreign Application Priority Data

Mar. 26, 2010 (JP) ................................ 2010-073159

(51) Int. Cl.
*C08G 64/02* (2006.01)
*C08G 64/30* (2006.01)
*C08K 5/34* (2006.01)

(52) U.S. Cl.
CPC ....... *C08G 64/0208* (2013.01); *C08G 64/305* (2013.01); *C08K 5/34* (2013.01); *Y02P 20/582* (2015.11)

(58) Field of Classification Search
CPC ..... C08G 64/0208; C08G 64/305; C08K 5/34
USPC ........................................................ 524/102
See application file for complete search history.

(56) References Cited

U.S. PATENT DOCUMENTS

| | | | | |
|---|---|---|---|---|
| 4,918,160 | A * | 4/1990 | Kondoh et al. | 528/483 |
| 7,297,735 | B2 | 11/2007 | Pearson et al. | |
| 7,482,397 | B2 | 1/2009 | Pearson et al. | |
| 7,491,760 | B2 | 2/2009 | Pearson et al. | |
| 8,268,953 | B2 | 9/2012 | Oda et al. | |
| 8,445,624 | B2 | 5/2013 | Fuji et al. | |
| 2004/0180996 | A1* | 9/2004 | Pearson et al. | 524/99 |
| 2004/0192813 | A1 | 9/2004 | Pearson et al. | |
| 2005/0277713 | A1* | 12/2005 | Pearson et al. | 524/99 |
| 2007/0117957 | A1* | 5/2007 | Mullen | 528/196 |
| 2007/0258351 | A1* | 11/2007 | Fujimaru et al. | 369/288 |
| 2008/0029933 | A1 | 2/2008 | Higashiizumi et al. | |
| 2010/0174015 | A1 | 7/2010 | Negishi et al. | |
| 2010/0190953 | A1 | 7/2010 | Fuji et al. | |
| 2010/0216914 | A1 | 8/2010 | Oda et al. | |
| 2011/0034646 | A1 | 2/2011 | Fuji et al. | |
| 2012/0232198 | A1 | 9/2012 | Sasaki | |
| 2012/0232243 | A1 | 9/2012 | Namiki et al. | |
| 2012/0238679 | A1 | 9/2012 | Sasaki | |
| 2012/0245264 | A1 | 9/2012 | Sasaki | |
| 2012/0245265 | A1 | 9/2012 | Sasaki | |
| 2012/0245266 | A1 | 9/2012 | Yokogi et al. | |

FOREIGN PATENT DOCUMENTS

| | | | | |
|---|---|---|---|---|
| CN | 1756797 A | | 4/2006 | |
| CN | 101448871 A | | 6/2009 | |
| CN | 102597057 A | | 7/2012 | |
| EP | 2 511 341 A1 | | 10/2012 | |
| JP | 2006-028441 | | 2/2006 | |
| JP | 2006-519916 | | 8/2006 | |
| JP | 2006-519917 | | 8/2006 | |
| JP | 2006-232897 | | 9/2006 | |
| JP | 2007-070391 | | 3/2007 | |
| JP | 2007-269903 A | | 10/2007 | |
| JP | 2008-024919 | | 2/2008 | |
| JP | 2008-274007 | | 11/2008 | |
| JP | 2009-061762 A | | 3/2009 | |
| JP | 2009-062501 | * | 3/2009 | C08G 64/16 |
| JP | 2009-091404 | | 4/2009 | |
| JP | 2009-091417 | | 4/2009 | |
| JP | 2009-144013 | | 7/2009 | |
| JP | 2009-144017 | | 7/2009 | |
| JP | 2009-144020 A | | 7/2009 | |
| JP | 2009-161745 A | | 7/2009 | |
| JP | 2009-249398 A | | 10/2009 | |
| WO | WO 2004/111106 | | 12/2004 | |

(Continued)

OTHER PUBLICATIONS

Machine translation of JP 2009-062501. Mar. 2009.*
Machine translation of JP 2009-061762. Mar. 2009.*
International Search Report dated Apr. 19, 2011 in PCT/JP2011/057347 filed Mar. 25, 2011.
Seiichi Honma; "Porikaboneta Jushi Handobukku"; The Nikkan Kogyo Shinbun, Ltd., 1992.
George L. Gaines, Jr.; "Acceleration of Hydrolysis of Bisphenol A Polycarbonate by Hindered Amines"; Polymer Degradation and Stability, 1990, vol. 27, pp. 13-18.
Office Action dated Sep. 4, 2013, in Chinese Patent Application No. 201180014758.5 filed Mar. 25, 2011 (with English translation).
U.S. Appl. No. 14/041,482, filed Sep. 30, 2013, Sasaki, et al.
Office Action dated Mar. 4, 2014, in Japanese Patent Application No. 2011-062711 filed Mar. 22, 2011 (with English translation).
Japanese Information Offer Form dated Jul. 22, 2014, in Patent Application No. 2011-062711 with English translation.

(Continued)

*Primary Examiner* — John E Uselding
(74) *Attorney, Agent, or Firm* — Oblon, McClelland, Maier & Neustadt, L.L.P.

(57) ABSTRACT

The invention is to provide a polycarbonate resin composition having excellent light resistance, transparency, hue, heat resistance, thermal stability, and mechanical strength. The invention relates to a polycarbonate resin composition which includes a polycarbonate resin at least containing structural units derived from a dihydroxy compound having the portion represented by the following general formula (1) as part of the structure thereof, the polycarbonate resin composition giving a molded object which has a haze of 12 or less as measured in accordance with a specific manner. (The case where the portion represented by the general formula (1) is part of —$CH_2$—O—H is excluded).

[Chem. 1]

$$\text{—}\!(\text{CH}_2\text{—O})\!\text{—} \quad (1)$$

20 Claims, No Drawings

(56) References Cited

FOREIGN PATENT DOCUMENTS

| | | | |
|---|---|---|---|
| WO | 2009/044907 | A1 | 4/2009 |
| WO | 2009-057609 | A1 | 5/2009 |
| WO | WO 2012/098513 | A1 | 7/2012 |

OTHER PUBLICATIONS

Combined Chinese Office Action and Search Report dated Jul. 7, 2014 in Patent Application No. 201180014758.5 (with English language translation).
Hongjun You, et al, "Features of light stabilizer", Contemporary Chemical Industry, vol. 33, No. 5, Oct. 31, 2004, pp. 266-268 (with English Abstract).
Li Jie, et al., "Basic function, evaluation and selecting principles of antioxidants and light stabilizer", Plastic Additives, vol. 51, No. 3, Dec. 31, 2005, pp. 30-34 (with English Abstract).
Notification of Reasons for Refusal dated Nov. 18, 2014, in Japanese Patent Application No. 2011-062711 filed Mar. 22, 2011 (with English translation).
Information Offer Form mailed Apr. 27, 2015, in corresponding Japanese Patent Application No. 2011-062711 (w/ English translation).
Office Action dated May 13, 2015, in corresponding Chinese Patent Application No. 201410102473.2 (w/ English translation).
Office Action dated Jul. 28, 2015 in Japanese Patent Application No. 2011-062711 (with English language translation).
Office Action dated Mar. 20, 2015 in Chinese Patent Application No. 201180014758.5 (with English language translation).
Anonymous, "Hindered Amine Light Stabilizers for Polycarbonates", Reseach Disclosure, Mason Publications, Hampshire, GB, vol. 354, No. 35, Oct. 1, 1993.
Extended European Search Report dated Sep. 17, 2015, in European Patent Application No. 11759572.8.
Decision of Rejection dated Sep. 28, 2015, in Chinese Patent Application No. 201180014758.5 (w/ English translation).
Office Action dated Oct. 12, 2015 in Chinese Patent Application No. 201410102473.2 (w/ English translation).
Office Action dated Feb. 29, 2016, issued in Chinese Patent Application No. 201410102473.2 (w/ English translation).
Notification of Reexamination dated May 26, 2016, in Chinese Patent Application No. 201180014758.5 (with English translation).
Office Action dated May 8, 2017, in Korean Patent Application No. 10-2012-7011729 (w/ English translation).
Decision for Reexamination dated Sep. 30. 2017 in Chinese Patent Application No. 201410102473.2 (w/ English translation).
Office Action dated Feb. 28, 2017, in European Patent Application No. 11 759 572.8.
Notification of Reexamination dated Sep. 30, 2016, in Chinese Patent Application No. 201410102473.2 (with English translation of pertinent portion).
Notification of Reexamination dated Mar. 2, 2017, in Chinese Patent Application No. 201410102473.2 (with English translation of the pertinent portion).
Reexamination Decision dated Nov. 3, 2016, in Chinese Patent Application No. 201180014758.5 (with English translation).
Information Statement submitted May 22, 2017 in Japanese Patent Application No. 2016-129408 (w/ English translation).
Office Action dated Jul. 4, 2017 in Japanese Patent Application No. 2016-129408 (w/ English translation).
Submission of Information issued Feb. 6, 2018 in Japanese Patent Application No. 2016-129408.
Summons to attend oral proceedings issued Feb. 13, 2018 in European Patent Application No. 11759572.8.
Office Action dated Feb. 20, 2018 in Japanese Patent Application No. 2016-129408.
Yasukazu Ohkatsu, "Polymer Additive: Basic Chemistry and Material Design", High Technology Information, CMC Publishing Co., Ltd., Apr. 30, 2008, pp. 182-185 (with English translation).
Hajime Nishihara, "Long Life-cycling Technologies of Polymer Materials", High Technology Information, CMC Publishing Co., Ltd., Jan. 1, 2001, pp. 80-83 (with English translation).
Submission of Information issued Apr. 26, 2018 in Japanese Patent Application No. 2016-129408 (with English language translation).
Combined Chinese Office Action and Search Report dated Jun. 22, 2018 in Chinese Patent Application No. 201710063096.X (with English translation), 20 pages.
Office Action dated Sep. 11, 2018, in Japanese Patent Application No. 2016-129408, citing AO (w/ Computer-generated English translation).

* cited by examiner

POLYCARBONATE RESIN COMPOSITION AND MOLDED ARTICLE

TECHNICAL FIELD

The present invention relates to a polycarbonate resin composition having excellent light resistance, moldability, transparency, hue, heat resistance, thermal stability, and mechanical strength and to a molded article obtained therefrom.

BACKGROUND ART

Polycarbonate resins are generally produced using bisphenols as a monomer ingredient, and are being extensively utilized as so-called engineering plastics in the fields of electrical and electronic parts, automotive parts, medical parts, building materials, films, sheets, bottles, optical recording media, lenses, etc. so as to take advantage of the superiority thereof such as transparency, heat resistance, and mechanical strength.

However, the conventional polycarbonate resins deteriorate in hue, transparency, and mechanical strength when used over a long period in places where the resins are exposed to ultraviolet rays or visible light. There hence have been limitations on outdoor use thereof and on use thereof in the vicinity of illuminators. Furthermore, use of the conventional polycarbonate resins as various molded articles has encountered a problem that the polycarbonate resins show poor mold release characteristics during melt molding and it is difficult to use the resins as transparent materials, optical materials, or the like.

Techniques in which a benzophenone-based ultraviolet absorber, benzotriazole-based ultraviolet absorber, or benzoxazine-based ultraviolet absorber is added to a polycarbonate resin in order to overcome such problems are widely known (see, for example, non-patent document 1).

However, addition of such an ultraviolet absorber poses the following problems although the addition brings about improvements in hue retention through ultraviolet irradiation, etc. Namely, there have been problems, for example, that the addition of the ultraviolet absorber deteriorates the hue, heat resistance, and transparency which are inherent in the resin and that the ultraviolet absorber volatilizes during molding to foul the mold.

Known as light stabilizers are hindered amine-based light stabilizers. However, polycarbonate resins are unstable to basic ingredients, e.g., alkalis, even at ordinary temperature, and it has been reported that polycarbonate resins are hydrolyzed by hindered-amine compounds also (see, for example, non-patent document 2). It is hence widely known that addition of hindered amine-based light stabilizers to polycarbonate resins is impracticable (see, for example, non-patent document 1).

The bisphenol compounds for use in producing conventional polycarbonate resins have a benzene ring structure and hence show high absorption of ultraviolet rays. This leads to a deterioration in the light resistance of the polycarbonate resins. Consequently, use of monomer units derived from an aliphatic dihydroxy compound or alicyclic dihydroxy compound which has no benzene ring structure in the molecular framework or from a cyclic dihydroxy compound having an ether bond in the molecule, such as isosorbide, is expected to theoretically improve light resistance. In particular, polycarbonate resins produced using, as a monomer, isosorbide obtained from biomass resources have excellent heat resistance and mechanical strength, and many investigations thereon hence have come to be made in recent years (see, for example, patent documents 1 to 7).

It is also widely known that benzotriazole, benzophenone, and cyanoacrylate compounds are added as ultraviolet absorbers to polycarbonate resin compositions obtained using a monomer having an ether bond in the molecule, such as isosorbide, isomannide, or isoidide, which each has no benzene ring structure in the molecular framework (see, for example, patent document 8).

PRIOR-ART DOCUMENTS

Patent Documents

Patent Document 1: International Publication No. 2004/111106
Patent Document 2: JP-A-2006-232897
Patent Document 3: JP-A-2006-28441
Patent Document 4: JP-A-2008-24919
Patent Document 5: JP-A-2009-91404
Patent Document 6: JP-A-2009-91417
Patent Document 7: JP-A-2008-274007
Patent Document 8: JP-A-2007-70391

Non-Patent Document

Non-Patent Document 1: *Porikāboneto Jushi Handobukku* (Aug. 28, 1992, published by The Nikkan Kogyo Shinbun, Ltd., edited by HONMA Seiichi)
Non-Patent Document 2: G. L. Gains, Jr., *Polym. Degradation Stab.*, 27, 13 (1990)

SUMMARY OF THE INVENTION

Problems that the Invention is to Solve

However, since aliphatic dihydroxy compounds, alicyclic dihydroxy compounds, and cyclic dihydroxy compounds having an ether bond in the molecule, such as isosorbide, have no phenolic hydroxyl group, it is difficult, as described in patent documents 1 to 7, to polymerize these compounds by the interfacial process which is widely known as a process for polycarbonate resin production using bisphenol A as a starting material. Usually, polycarbonate resins are produced from those compounds by the process which is called a transesterification process or a melt process. In this process, any of those dihydroxy compounds and a carbonic diester, e.g., diphenyl carbonate, are subjected to transesterification at a high temperature of 200° C. or above in the presence of a basic catalyst, and the by-product, e.g., phenol, is removed from the system to allow the polymerization to proceed, thereby obtaining a polycarbonate resin. However, the polycarbonate resins obtained using monomers having no phenolic hydroxyl group, such as those shown above, have poor thermal stability as compared with polycarbonate resins obtained using monomers having phenolic hydroxyl groups, e.g., bisphenol A, and hence have had the following problem. The polycarbonate resins take a color during the polymerization or molding in which the resins are exposed to high temperatures and, as a result, the polycarbonate resins come to absorb ultraviolet rays and visible light and hence have impaired light resistance. Especially when a monomer having an ether bond in the molecule, such as isosorbide, was used, the polycarbonate resin considerably deteriorates in hue. A significant improvement has been desired. Furthermore, when such polycarbonate resins are to be used as various molded articles, the resins are melt-molded at high temperatures. For this application also, there has been a desire for a material having satisfactory thermal stability and excellent moldability and mold release characteristics.

Moreover, addition of an ultraviolet absorber in the manner described in patent document 8 has encountered a problem that the addition of the ultraviolet absorber deteriorates the hue, heat resistance, and transparency in a weatherability test which are inherent in the resin.

An object of the invention is to eliminate the problems of prior-art techniques described above and to provide a polycarbonate resin composition which has excellent light resistance, weatherability, heat resistance, moldability, transparency, hue, and thermal stability, is inhibited from suffering a deterioration, such as hydrolysis, due to the lapse of time, and has excellent mechanical strength. Another object of the invention is to provide a molded article formed from the composition.

Means for Solving the Problems

The present inventors diligently made investigations in order to overcome those problems. As a result, the inventors have found that a polycarbonate resin composition which includes a polycarbonate resin at least containing structural units derived from a dihydroxy compound having the portion represented by the following general formula (1) as part of the structure thereof and which is characterized in that a molded object (thickness, 3 mm) formed from the polycarbonate resin composition has a haze, as measured in accordance with JIS K7105, of 12 or less after having undergone a 1,200-hour irradiation treatment with a sunshine carbon arc lamp through a type-A glass filter in accordance with JIS B7753 in an environment having a black panel temperature of 63° C., a relative humidity of 50%, and a rainfall spray period per hour of 12 minutes at a discharge voltage of 50 V and a discharge current of 60 A not only has excellent light resistance but also has excellent moldability, transparency, hue, heat resistance, thermal stability, and mechanical strength. The invention has been thus achieved.

[Chem. 1]

$$\text{-}\!\left(CH_2\text{—}O\right)\!\text{-} \quad (1)$$

(The case where the portion represented by the general formula (1) is part of —$CH_2$—O—H is excluded).

Essential points of the invention reside in the following [1] to [20].

[1] A polycarbonate resin composition which includes a polycarbonate resin at least containing structural units derived from a dihydroxy compound having the portion represented by the following general formula (1) as part of the structure thereof, the polycarbonate resin composition giving a molded object having a thickness of 3 mm which has a haze, as measured in accordance with JIS K7105, of 12 or less after having undergone a 1,200-hour irradiation treatment with a sunshine carbon arc lamp through a type-A glass filter in accordance with JIS B7753 in an environment having a black panel temperature of 63° C., a relative humidity of 50%, and a rainfall spray period per hour of 12 minutes at a discharge voltage of 50 V and a discharge current of 60 A.

[Chem. 2]

$$\text{-}\!\left(CH_2\text{—}O\right)\!\text{-} \quad (1)$$

(The case where the portion represented by the general formula (1) is part of —$CH_2$—O—H is excluded).

[2] The polycarbonate resin composition according to [1] wherein the molded object (thickness, 3 mm) formed from the polycarbonate resin composition has a value of yellowness index (YI) as measured by the illuminant-C transmission method of 10 or less.

[3] The polycarbonate resin composition according to [1] or [2] wherein the polycarbonate resin is a polycarbonate resin obtained by condensation-polymerizing one or more dihydroxy compounds including a dihydroxy compound having the portion represented by the general formula (1) as part of the structure thereof with a carbonic diester represented by the following general formula (2), and the polycarbonate resin composition contains the carbonic diester represented by the following general formula (2) in an amount of 60 weight ppm or less.

[Chem. 3]

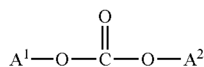

(2)

(In the general formula (2), $A^1$ and $A^2$ each represent a substituted or unsubstituted aliphatic group having 1-18 carbon atoms or a substituted or unsubstituted aromatic group, and $A^1$ and $A^2$ may be the same or different).

[4] The polycarbonate resin composition according to any one of [1] to [3] which contains an aromatic monohydroxy compound in an amount of 700 weight ppm or less.

[5] The polycarbonate resin composition according to any one of [1] to [4] wherein the polycarbonate resin contains the end group represented by the following general formula (3) in an amount in the range of 20-160 μeq/g.

[Chem. 4]

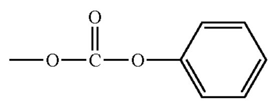

(3)

[6] The polycarbonate resin composition according to any one of [1] to [5] wherein when the number of moles of the H bonded to the aromatic rings of the polycarbonate resin is expressed by A and the number of moles of the H bonded to the part other than the aromatic rings is expressed by B, then $A/(A+B) \leq 0.05$.

[7] The polycarbonate resin composition according to any one of [1] to [6] wherein the dihydroxy compound having the portion represented by the general formula (1) as part of the structure thereof is a compound represented by the following general formula (4).

[Chem. 5]

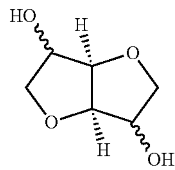

(4)

[8] The polycarbonate resin composition according to any one of [1] to [7] wherein the polycarbonate resin further contains structural units derived from at least one compound selected from aliphatic dihydroxy compounds and alicyclic dihydroxy compounds.

[9] The polycarbonate resin composition according to any one of [1] to [8] wherein the polycarbonate resin contains the structural units derived from a dihydroxy compound having the portion represented by the general formula (1) as part of the structure thereof, in an amount of 90 mol % or less.

[10] The polycarbonate resin composition according to any one of [1] to [9] which contains a light resistance improver in an amount of 0.0001-1 part by weight per 100 parts by weight of the polycarbonate resin.

[11] The polycarbonate resin composition according to [10] wherein the light resistance improver is an amine compound.

[12] The polycarbonate resin composition according to [11] wherein the light resistance improver has one or more piperidine structures.

[13] The polycarbonate resin composition according to [12] wherein the light resistance improver has a plurality of piperidine structures.

[14] The polycarbonate resin composition according to [13] wherein the plurality of piperidine structures possessed by the light resistance improver have been bonded to each other through an ester bond.

[15] The polycarbonate resin composition according to any one of [1] to [14] which contains a release agent in an amount of 0.0001-1 part by weight per 100 parts by weight of the polycarbonate resin.

[16] The polycarbonate resin composition according to any one of [1] to [15] which contains an antioxidant in an amount of 0.0001-1 part by weight per 100 parts by weight of the polycarbonate resin.

[17] A polycarbonate resin composition which includes a polycarbonate resin at least containing structural units derived from a dihydroxy compound having the portion represented by the following general formula (1) as part of the structure thereof and a compound having a plurality of piperidine structures, the amount of the compound having piperidine structures being 0.0001-1 part by weight per 100 parts by weight of the polycarbonate resin.

[Chem. 6]

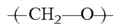

$$-\!\left(CH_2-O\right)\!- \quad (1)$$

(The case where the portion represented by the general formula (1) is part of $-CH_2-O-H$ is excluded).

[18] A polycarbonate resin molded article obtained by molding the polycarbonate resin composition according to any one of [1] to [17].

[19] The polycarbonate resin molded article according to [18] which has been molded by injection molding.

[20] A building material for outdoor use which is constituted of the polycarbonate resin molded article according to [18] or [19].

Effects of the Invention

According to the invention, it is possible to provide a polycarbonate resin composition and a molded article which not only have excellent light resistance but also have excellent moldability, transparency, hue, heat resistance, thermal stability, and mechanical strength, and which are applicable to a wide range of fields including the field of injection molding, such as electrical/electronic parts and automotive parts, the field of films and sheets, the field of bottles and containers, lens applications such as camera lenses, finder lenses, and lenses for CCDs or CMOSs, films or sheets such as retardation films, diffusing sheets, and polarizing films which are utilized in liquid-crystal or plasma displays and the like, optical disks, optical materials, optical parts, binder applications for fixing colorants, charge transfer agents, etc., and building member applications. In particular, it is possible to provide a polycarbonate resin composition and a molded article which are suitable for use in applications in which the composition and the molded article are exposed to light including ultraviolet rays, such as outdoor or lighting parts.

MODES FOR CARRYING OUT THE INVENTION

Modes for carrying out the invention will be explained below in detail. The following explanations on constituent elements are for embodiments (representative embodiments) of the invention, and the invention should not be construed as being limited to the embodiments unless the invention departs from the spirit thereof. In this description, "% by weight", "weight ppm", and "parts by weight" have the same meanings as "% by mass", "mass ppm", and "parts by mass", respectively.

(1) Polycarbonate Resin Composition

The polycarbonate resin composition of the invention is a polycarbonate resin composition which includes a polycarbonate resin at least containing structural units derived from a dihydroxy compound having the portion represented by the following general formula (1) as part of the structure thereof. The polycarbonate resin composition of the invention has the following property: a molded object (thickness, 3 mm) formed from the polycarbonate resin composition has a haze, as measured in accordance with JIS K7105 (1981), of 12 or less after having undergone a 1,200-hour irradiation treatment with a sunshine carbon arc lamp through a type-A glass filter in accordance with JIS B7753 (2007) in an environment having a black panel temperature of 63° C., a relative humidity of 50%, and a rainfall spray period per hour of 12 minutes at a discharge voltage of 50 V and a discharge current of 60 A. Because of this, the resin composition not only has excellent light resistance but also has excellent moldability, transparency, hue, heat resistance, thermal stability, and mechanical strength.

[Chem. 7]

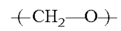

$$-\!\left(CH_2-O\right)\!- \quad (1)$$

(The case where the portion represented by the general formula (1) is part of $-CH_2-O-H$ is excluded).

The irradiation treatment with a sunshine carbon arc lamp in the invention is a treatment in which using a specific apparatus, specific filter, etc. and using a sunshine carbon arc lamp at a discharge voltage of 50 V and a discharge current of 60 A, a sample is irradiated for 1,200 hours with light mainly having wavelengths of 300-1,100 nm at a black panel temperature of 63° C. in an environment having a relative humidity of 50% and a rainfall spray period per hour of 12 minutes, as will be described later.

The polycarbonate resin composition of the invention is a polycarbonate resin composition which includes a polycarbonate resin at least containing structural units derived from the specific dihydroxy compound and which, after having undergone the irradiation treatment with a sunshine carbon arc lamp, has a haze, as measured in accordance with JIS K7105, of generally 12 or less, preferably 10 or less, more preferably 8 or less, most preferably 5 or less. Hazes thereof exceeding 12 may result in the cases where the polycarbonate resin composition is opaque.

It is preferred that the polycarbonate resin composition of the invention should satisfy the following. A molded object (thickness, 3 mm) formed from the polycarbonate resin composition has a value of yellowness index (YI) (hereinafter often referred to as “initial yellowness index value” or “initial YI value”) as measured by the illuminant-C transmission method of 10 or less. The initial YI value thereof is more preferably 7 or less, most preferably 5 or less. In the case where the initial YI value thereof exceeds 10, this composition tends to have impaired light resistance.

There usually are the cases where molded objects of a polycarbonate resin composition differ in color tone because of the influence of the heat history or the like due to the steps for producing the molded objects. The polycarbonate resin composition of the invention is especially apt to yellow when held at an excessively high temperature for a long period during the production of molded objects therefrom. However, the molded object (thickness, 3 mm) according to the invention to be used for specifying the properties thereof may be a molded object obtained through any production step usually employed for molding the polycarbonate resin composition of the invention into products, so long as the molded object is a 3 mm-thick object molded from the polycarbonate resin composition of the invention and capable of being evaluated. The polycarbonate resin composition of the invention is a composition in which the molded object having a thickness of 3 mm has a haze, as measured in accordance with JIS K7105, of 12 or less after having undergone a 1,200-hour irradiation treatment with a sunshine carbon arc lamp through a type-A glass filter in accordance with JIS B7753 in an environment having a black panel temperature of 63° C., a relative humidity of 50%, and a rainfall spray period per hour of 12 minutes at a discharge voltage of 50 V and a discharge current of 60 A. More specifically, the polycarbonate resin composition can be evaluated, for example, by examining a molded object obtained by drying pellets of the polycarbonate resin composition at 90° C. for 10 hours in a nitrogen atmosphere and injection-molding the dried polycarbonate resin composition pellets with an injection molding machine (Type J75EII, manufactured by The Japan Steel Works, Ltd.) under the conditions of a resin temperature of 220° C. and a molding cycle of 23 seconds into a shape having a width of 60 mm, a length of 60 mm, and a thickness of 3 mm.

Furthermore, it is preferred that the polycarbonate resin composition of the invention should satisfy the following: the absolute value of the difference between the initial yellowness index value of a molded object (thickness, 3 mm) formed from the polycarbonate resin composition and the yellowness index value thereof measured in accordance with JIS K7105 (1981) after the molded object has undergone a 1,200-hour irradiation treatment with a sunshine carbon arc lamp through a type-A glass filter in accordance with JIS B7753 in an environment having a black panel temperature of 63° C., a relative humidity of 50%, and a rainfall spray period per hour of 12 minutes at a discharge voltage of 50 V and a discharge current of 60 A is 8 or less. The absolute value thereof is more preferably 5 or less, most preferably 3 or less.

So long as the polycarbonate resin composition has the properties described above, the effects of the invention are produced. Such a polycarbonate resin composition can be produced, for example, by suitably selecting the kind and amount of a catalyst, suitably selecting a polymerization temperature and a polymerization period, diminishing the compounds which have the ability to absorb ultraviolet rays and are contained in the resin composition, e.g., residual phenol and residual diphenyl carbonate, reducing the amount of any starting-material monomer to be used which has the ability to absorb light in the ultraviolet region, reducing the use amount of any substance which is contained as an impurity in the starting materials and has the ability to absorb light in the ultraviolet region, incorporating a light stabilizer, reducing the content of a dihydroxy compound having an ether bond in the structural units each derived from a dihydroxy compound, etc.

A process for producing the polycarbonate resin composition of the invention is described below in detail.

(2) Polycarbonate Resin

<Starting Materials>

(Dihydroxy Compounds)

The polycarbonate resin to be used in the polycarbonate resin composition of the invention at least contains structural units derived from a dihydroxy compound having the portion represented by the following general formula (1) as part of the structure thereof (hereinafter often referred to as “dihydroxy compound according to the invention”). Namely, the term “dihydroxy compound according to the invention” means a dihydroxy compound which at least contains two hydroxyl groups and the structural unit represented by the following general formula (1).

[Chem. 8]

$$\text{-}\!\!\left(CH_2\text{—}O\right)\!\!\text{-} \quad (1)$$

(The case where the portion represented by the general formula (1) is part of $\text{—}CH_2\text{—}O\text{—}H$ is excluded).

Too high proportions of the structural units derived from a dihydroxy compound having the portion represented by the general formula (1) may result in the cases where the polycarbonate resin molded article obtained by molding the polycarbonate resin composition of the invention cracks after having undergone an irradiation treatment with a sunshine carbon arc lamp and also in the cases where the resin molded article has impaired transparency and an increased haze. However, by incorporating the light resistance improver which will be described later, preferably a light stabilizer, in particular an amine compound in an amount within a given range, into the polycarbonate resin composition, the polycarbonate resin molded article can be prevented from cracking. The reason why the polycarbonate resin molded article suffers cracking is not clear. It is, however, thought that too high proportions of the structural units derived from a dihydroxy compound having the portion represented by the general formula (1) cause the surface of the polycarbonate resin molded article to be deteriorated by ultraviolet irradiation and to hydrolyze, resulting in a decrease in the molecular weight of the resin molded article to cause the cracking. However, it is possible to prevent the cracking of the polycarbonate resin molded article by incorporating an amine compound into the polycarbonate resin composition as stated above. Although the reason for it therefor is not clear, it is thought that the amine compound inhibits the surface of the polycarbonate resin molded article from being deteriorated by ultraviolet irradiation and from hydrolyzing and renders the resin molded article less apt to decrease in molecular weight, thereby preventing the resin molded article from cracking. Even when an amine compound, which is a basic compound, is present in the polycarbonate resin that is to be used in the polycarbonate resin composition of the invention and at least contains structural units derived from a dihydroxy compound having the portion represented by the formula (1), this polycarbonate resin unexpectedly suffers no deterioration, such as hydrolysis, caused by the influence of the amine compound. There is a low possibility that the polycarbonate resin molded article formed from this polycarbonate resin might crack or have impaired transparency and an increased haze even after having undergone an irradiation treatment with a sunshine carbon arc lamp.

On the other hand, when the proportion of the structural units derived from a dihydroxy compound having the portion represented by the general formula (1) is too low, there are the cases where the polycarbonate resin composition and the molded article thereof have reduced heat resistance.

For the reasons give above, the proportion of the structural units derived from a dihydroxy compound having the portion represented by the general formula (1) to the number of moles of all structural units each derived from a dihydroxy compound is preferably 90 mol % or less, more preferably 85 mol % or less, even more preferably 82 mol % or less, especially preferably 80 mol % or less. On the other hand, the proportion thereof is preferably 10 mol % or higher, more preferably 20 mol % or higher, even more preferably 30 mol % or higher, especially preferably 40 mol % or higher.

The dihydroxy compound according to the invention is not particularly limited so long as the dihydroxy compound has the portion represented by the general formula (1) as part of the structure thereof. Examples thereof include oxyalkylene glycols such as diethylene glycol, triethylene glycol, and tetraethylene glycol, compounds which have an aromatic group as a side chain and have, in the main chain, ether groups each bonded to an aromatic group, such as phenyl-substituted fluorenes, e.g., 9,9-bis(4-(2-hydroxyethoxy)phenyl)fluorene, 9,9-bis(4-(2-hydroxyethoxy)-3-methylphenyl) fluorene, 9,9-bis(4-(2-hydroxyethoxy)-3-isopropylphenyl) fluorene, 9,9-bis(4-(2-hydroxyethoxy)-3-isobutylphenyl) fluorene, 9,9-bis(4-(2-hydroxyethoxy)-3-tert-butylphenyl) fluorene, 9,9-bis(4-(2-hydroxyethoxy)-3-cyclohexylphenyl) fluorene, 9,9-bis(4-(2-hydroxyethoxy)-3-phenylphenyl) fluorene, 9,9-bis(4-(2-hydroxyethoxy)-3,5-dimethylphenyl) fluorene, 9,9-bis(4-(2-hydroxyethoxy)-3-tert-butyl-6-methylphenyl)fluorene and 9,9-bis(4-(3-hydroxy-2,2-dimethylpropoxy)phenyl)fluorene, dihydroxy compounds represented by the following formula (4), and compounds having a cyclic ether structure, such as the spiro glycols represented by the following formula (5) and formula (6).

Preferred of these dihydroxy compounds are oxyalkylene glycols such as diethylene glycol and triethylene glycol and compounds having a cyclic ether structure, from the standpoints of availability, handling, reactivity during polymerization, and the hue of the polycarbonate resin to be obtained. Preferred of the compounds having a cyclic ether structure are compounds having a plurality of cyclic structures.

Preferred of these from the standpoint of heat resistance are compounds having a cyclic ether structure which are represented by the dihydroxy compounds represented by the following general formulae (4), (5), and (6). Preferred of the compounds having a cyclic ether structure are the compounds having a plurality of cyclic structures. Especially preferred are anhydrous sugar alcohols represented by dihydroxy compounds represented by the following formula (4).

These dihydroxy compounds may be used alone or in combination of two or more thereof according to the performances required of the polycarbonate resin to be obtained.

[Chem. 9]

(4)

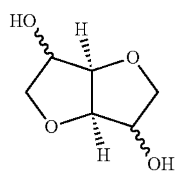

[Chem. 10]

(5)

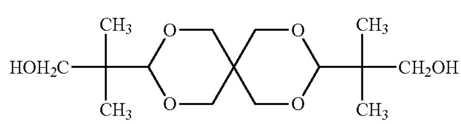

[Chem. 11]

(6)

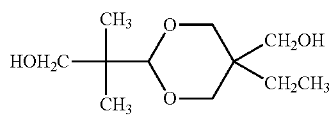

Examples of the dihydroxy compounds represented by the general formula (4) include isosorbide, isomannide, and isoidide, which are stereoisomers. These compounds may be used alone or in combination of two or more thereof.

From the standpoint of the light resistance of the polycarbonate resin, it is preferred to use dihydroxy compounds having no aromatic ring structure among those dihydroxy compounds. Most preferred of these dihydroxy compounds is isosorbide from the standpoints of availability, ease of production, light resistance, optical properties, moldability, heat resistance, and carbon neutrality. Isosorbide is obtained by the dehydrating condensation of sorbitol, which is produced from various starches that are plant-derived abundant resources and are easily available.

The polycarbonate resin according to the invention may contain structural units derived from dihydroxy compounds (hereinafter often referred to as "other dihydroxy compounds") other than the dihydroxy compound according to the invention. Examples of the other dihydroxy compounds include aliphatic dihydroxy compounds such as ethylene glycol, 1,3-propanediol, 1,2-propanediol, 1,4-butanediol, 1,3-butanediol, 1,2-butanediol, 1,5-heptanediol, and 1,6-hexanediol, alicyclic dihydroxy compounds such as 1,2-cyclohexanedimethanol, 1,3-cyclohexanedimethanol, 1,4-cyclohexanedimethanol, tricyclodecanedimethanol, pentacyclopentadecanedimethanol, 2,6-decalindimethanol, 1,5-decalindimethanol, 2,3-decalindimethanol, 2,3-norbornanedimethanol, 2,5-norbornanedimethanol, and 1,3-adamantanedimethanol, and aromatic bisphenol compounds such as 2,2-bis(4-hydroxyphenyl)propane [=bisphenol A], 2,2-bis(4-hydroxy-3,5-dimethylphenyl)propane, 2,2-bis(4-hydroxy-3,5-diethylphenyl)propane, 2,2-bis(4-hydroxy-(3,5-diphenyl)phenyl)propane, 2,2-bis(4-hydroxy-3,5-dibromophenyl)propane, 2,2-bis(4-hydroxyphenyl)pentane, 2,4-dihydroxydiphenylmethane, bis(4-hydroxyphenyl)methane, bis(4-hydroxy-5-nitrophenyl)methane, 1,1-bis(4-hydroxyphenyl)ethane, 3,3-bis(4-hydroxyphenyl)pentane, 1,1-bis(4-hydroxyphenyl)cyclohexane, bis(4-hydroxyphenyl)sulfone, 2,4'-dihydroxydiphenyl sulfone, bis(4-hydroxyphenyl)sulfide, 4,4'-dihydroxydiphenyl ether, 4,4'-dihydroxy-3,3'-dichlorodiphenyl ether, 9,9-bis(4-(2-hydroxyethoxy-2-methyl)phenyl)fluorene, 9,9-bis(4-hydroxyphenyl)fluorene, and 9,9-bis(4-hydroxy-2-methylphenyl)fluorene.

Preferred of these, from the standpoint of the light resistance of the polycarbonate resin, are the dihydroxy compounds having no aromatic ring structure in the molecular structure, i.e., the aliphatic dihydroxy compounds and/or the alicyclic dihydroxy compounds. Especially preferred aliphatic dihydroxy compounds are 1,3-propanediol, 1,4-butanediol, and 1,6-hexanediol. Especially preferred alicyclic dihydroxy compounds are 1,4-cyclohexanedimethanol and tricyclodecanedimethanol.

Use of such other dihydroxy compounds makes it possible to obtain effects such as an improvement in the flexibility of the polycarbonate resin, improvement in the heat resistance thereof, improvement in the moldability thereof, etc. However, in the case where the content of structural units derived from other dihydroxy compounds is too high, this may result in a decrease in mechanical property and a decrease in heat resistance. Consequently, the proportion of the structural units derived from the dihydroxy compound according to the invention to all structural units each derived from a dihydroxy compound is 10% by mole or higher, preferably 15% by mole or higher, more preferably 20% by mole or higher.

The dihydroxy compound according to the invention may contain stabilizers such as a reducing agent, antioxidant, free-oxygen scavenger, light stabilizer, antacid, pH stabilizer, and heat stabilizer. Since the dihydroxy compound according to the invention is apt to alter especially under acidic conditions, it is preferred that the dihydroxy compound should contain a basic stabilizer. Examples of the basic stabilizer include the hydroxides, carbonates, phosphates, phosphites, hypophosphites, borates, and fatty acid salts of Group-1 or Group-2 metals of the long-form periodic table (Nomenclature of Inorganic Chemistry IUPAC Recommendations 2005). Examples thereof further include basic ammonium compounds such as tetramethylammonium hydroxide, tetraethylammonium hydroxide, tetrapropylammonium hydroxide, tetrabutylammonium hydroxide, trimethylethylammonium hydroxide, trimethylbenzylammonium hydroxide, trimethylphenylammonium hydroxide, triethylmethylammonium hydroxide, triethylbenzylammonium hydroxide, triethylphenylammonium hydroxide, tributylbenzylammonium hydroxide, tributylphenylammonium hydroxide, tetraphenylammonium hydroxide, benzyltriphenylammonium hydroxide, methyltriphenylammonium hydroxide, and butyltriphenylammonium hydroxide and amine compounds such as 4-aminopyridine, 2-aminopyridine, N,N-dimethyl-4-aminopyridine, 4-diethylaminopyridine, 2-hydroxypyridine, 2-methoxypyridine, 4-methoxypyridine, 2-dimethylaminoimidazole, 2-methoxyimidazole, imidazole, 2-mercaptoimidazole, 2-methylimidazole, and aminoquinoline. Of these, the phosphates and phosphites of sodium or potassium are preferred from the standpoints of the effect thereof and the ease of removal thereof by distillation which will be described later. Especially preferred are disodium hydrogen phosphate and disodium hydrogen phosphite.

There are no particular limitations on the content of those basic stabilizers in the dihydroxy compound according to the invention. In the case where the content thereof is too low, there is a possibility that the effect of preventing the alteration of the dihydroxy compound according to the invention might not be obtained. When the content thereof is too high, there are the cases where the dihydroxy compound according to the invention is altered. Consequently, the content of those basic stabilizers is generally 0.0001-1% by weight, preferably 0.001-0.1% by weight, based on the dihydroxy compound according to the invention.

When the dihydroxy compound according to the invention which contains those basic stabilizers is used as a starting material for producing the polycarbonate resin, not only the basic stabilizers themselves serve as a polymerization catalyst to make it difficult to control polymerization rate and quality, but also the presence of the basic stabilizers leads to a deterioration in initial hue, resulting in molded articles having impaired light resistance. It is therefore preferred that the basic stabilizers should be removed with an ion-exchange resin or by distillation or the like before the dihydroxy compound is used as a starting material for producing the polycarbonate resin.

In the case where the dihydroxy compound according to the invention is a compound having a cyclic ether structure, e.g., isosorbide, this dihydroxy compound is apt to be gradually oxidized by oxygen. It is therefore important to prevent water inclusion during storage or production in order to prevent decomposition caused by oxygen. It is also important to use a free-oxygen scavenger or the like or to handle the dihydroxy compound in a nitrogen atmosphere. There are the cases where isosorbide, upon oxidation, generates decomposition products including formic acid. For example, in the case where isosorbide containing those decomposition products is used as a starting material for producing a polycarbonate resin, there is the possibility of resulting in coloring of the polycarbonate resin obtained and in coloring of the polycarbonate resin composition. There also is a possibility that the decomposition products considerably deteriorate the properties of the resin. In addition, there are the cases where the decomposition products affect the polymerization reaction to make it impossible to obtain a polymer having a high molecular weight. Use of such isosorbide hence is undesirable.

It is preferred to conduct purification by distillation in order to obtain the dihydroxy compound according to the invention which does not contain the oxidative-decomposition products and to remove the basic stabilizers described above. The distillation in this case may be simple distillation or continuous distillation, and is not particularly limited. With respect to distillation conditions, it is preferred to conduct distillation at a reduced pressure in an inert gas atmosphere such as argon or nitrogen. From the standpoint of inhibiting thermal alteration, it is preferred to conduct the distillation under the conditions of 250° C. or lower, preferably 200° C. or lower, especially 180° C. or lower.

Through such purification by distillation, the content of formic acid in the dihydroxy compound according to the invention is reduced to 20 weight ppm or less, preferably 10 weight ppm or less, especially preferably 5 weight ppm or less. As a result, when dihydroxy compounds including this dihydroxy compound according to the invention are used as a starting material for producing a polycarbonate resin, polymerizability is not impaired and a polycarbonate resin having an excellent hue and excellent thermal stability can be produced. The content of formic acid is determined by ion chromatography.

(Carbonic Diester)

The polycarbonate resin according to the invention can be obtained using one or more dihydroxy compounds including the dihydroxy compound according to the invention described above and a carbonic diester as starting materials, by condensation-polymerizing the starting materials by means of a transesterification reaction.

Examples of the carbonic diester to be used usually include compounds represented by the following general formula (2). One of these carbonic diesters may be used alone, or a mixture of two or more thereof may be used.

[Chem. 12]

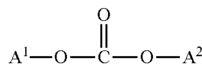

(2)

(In the general formula (2), $A^1$ and $A^2$ each are a substituted or unsubstituted aliphatic group having 1-18 carbon atoms or a substituted or unsubstituted aromatic group, and $A^1$ and $A^2$ may be the same or different).

Examples of the carbonic diesters represented by the general formula (2) include diphenyl carbonate, substituted diphenyl carbonates, e.g., ditolyl carbonate, dimethyl carbonate, diethyl carbonate, and di-t-butyl carbonate. Preferred are diphenyl carbonate and substituted diphenyl carbonates. Especially preferred is diphenyl carbonate. Incidentally, there are the cases where carbonic diesters contain impurities such as chloride ions and where the impurities inhibit the polymerization reaction and impair the hue of the polycarbonate resin to be obtained. It is therefore preferred that a carbonic diester which has been purified by, for example, distillation should be used according to need.

<Transesterification Reaction Catalyst>

The polycarbonate resin according to the invention may be produced by subjecting one or more dihydroxy compounds including the dihydroxy compound according to the invention as described above and a carbonic diester represented by the general formula (2) to a transesterification reaction. More specifically, the polycarbonate resin is obtained by subjecting the starting materials to transesterification and removing the by-product monohydroxy compound, etc. from the system. In this case, polycondensation is usually conducted by means of a transesterification reaction in the presence of a transesterification reaction catalyst.

The transesterification reaction catalyst (hereinafter often referred to simply as catalyst or polymerization catalyst) which can be used for producing the polycarbonate resin according to the invention can affect light transmittance as measured especially at a wavelength of 350 nm and yellowness index (YI) value.

The catalyst to be used is not limited so long as the catalyst enables the polycarbonate resin composition produced therewith to satisfy, in particular, light resistance among light resistance, transparency, hue, heat resistance, thermal stability, moldability, and mechanical strength. Examples thereof include compounds of metals belonging to the Group 1 or Group 2 of the long-form periodic table (hereinafter referred to simply as "Group 1" or "Group 2") and basic compounds such as basic boron compounds, basic phosphorus compounds, basic ammonium compounds, and amine compounds. It is preferred to use a Group-1 metal compound and/or a Group-2 metal compound.

It is possible to use a basic compound such as a basic boron compound, basic phosphorus compound, basic ammonium compound, or amine compound as an auxiliary together with a Group-1 metal compound and/or a Group-2 metal compound. It is, however, especially preferred to use a Group-1 metal compound and/or a Group-2 metal compound only.

With respect to the form of the Group-1 metal compound and/or Group-2 metal compound, the compound is used usually in the form of a hydroxide or a salt such as carbonate, carboxylate, or phenolate. However, hydroxides, carbonates, and acetates are preferred from the standpoints of availability and handleability, and acetates are preferred from the standpoints of hue and activity in polymerization.

Examples of the Group-1 metal compound include sodium hydroxide, potassium hydroxide, lithium hydroxide, cesium hydroxide, sodium hydrogen carbonate, potassium hydrogen carbonate, lithium hydrogen carbonate, cesium hydrogen carbonate, sodium carbonate, potassium carbonate, lithium carbonate, cesium carbonate, sodium acetate, potassium acetate, lithium acetate, cesium acetate, sodium stearate, potassium stearate, lithium stearate, cesium stearate, sodium boron hydride, potassium boron hydride, lithium boron hydride, cesium boron hydride, phenylated boron-sodium compounds, phenylated boron-potassium compounds, phenylated boron-lithium compounds, phenylated boron-cesium compounds, sodium benzoate, potassium benzoate, lithium benzoate, cesium benzoate, disodium hydrogen phosphate, dipotassium hydrogen phosphate, dilithium hydrogen phosphate, dicesium hydrogen phosphate, disodium phenyl phosphate, dipotassium phenyl phosphate, dilithium phenyl phosphate, dicesium phenyl phosphate, alcoholates or phenolates of sodium, potassium, lithium, and cesium, and the disodium salt, dipotassium salt, dilithium salt, and dicesium salt of bisphenol A. Preferred of these are the lithium compounds.

Examples of the Group-2 metal compound include calcium hydroxide, barium hydroxide, magnesium hydroxide, strontium hydroxide, calcium hydrogen carbonate, barium hydrogen carbonate, magnesium hydrogen carbonate, strontium hydrogen carbonate, calcium carbonate, barium carbonate, magnesium carbonate, strontium carbonate, calcium acetate, barium acetate, magnesium acetate, strontium acetate, calcium stearate, barium stearate, magnesium stearate, and strontium stearate. Preferred of these are the magnesium compounds, the calcium compounds, and the barium compounds. From the standpoints of activity in polymerization and the hue of the polycarbonate resin composition to be obtained, the magnesium compounds and/or the calcium compounds are more preferred, and the calcium compounds are most preferred.

Examples of the basic boron compounds include the sodium salts, potassium salts, lithium salts, calcium salts, barium salts, magnesium salts, or strontium salts of tetramethylboron, tetraethylboron, tetrapropylboron, tetrabutylboron, trimethylethylboron, trimethylbenzylboron, trimethylphenylboron, triethylmethylboron, triethylbenzylboron, triethylphenylboron, tributylbenzylboron, tributylphenylboron, tetraphenylboron, benzyltriphenylboron, methyltriphenylboron, and butyltriphenylboron.

Examples of the basic phosphorus compounds include triethylphosphine, tri-n-propylphosphine, triisopropylphosphine, tri-n-butylphosphine, triphenylphosphine, tributylphosphine, and quaternary phosphonium salts.

Examples of the basic ammonium compounds include tetramethylammonium hydroxide, tetraethylammonium hydroxide, tetrapropylammonium hydroxide, tetrabutylammonium hydroxide, trimethylethylammonium hydroxide, trimethylbenzylammonium hydroxide, trimethylphenylammonium hydroxide, triethylmethylammonium hydroxide, triethylbenzylammonium hydroxide, triethylphenylammonium hydroxide, tributylbenzylammonium hydroxide, tributylphenylammonium hydroxide, tetraphenylammonium hydroxide, benzyltriphenylammonium hydroxide, methyltriphenylammonium hydroxide, and butyltriphenylammonium hydroxide.

Examples of the amine compounds include 4-aminopyridine, 2-aminopyridine, N,N-dimethyl-4-aminopyridine, 4-diethylaminopyridine, 2-hydroxypyridine, 2-methoxypyridine, 4-methoxypyridine, 2-dimethylaminoimidazole, 2-methoxyimidazole, imidazole, 2-mercaptoimidazole, 2-methylimidazole, and aminoquinoline.

The amount of the polymerization catalyst to be used is generally 0.1-300 μmol, preferably 0.5-100 μmol, per mole of all dihydroxy compounds subjected to the polymerization. Especially in the case where use is made of one or more compounds containing at least one metal selected from the group consisting of lithium and the Group-2 metals of the long-form periodic table, in particular, in the case where a magnesium compound and/or a calcium compound is used, the amount of this catalyst is generally 0.1 mmol or more, preferably 0.5 mmol or more, especially preferably 0.7 μmol or more, in terms of metal amount per mole of all dihydroxy compounds. The suitable upper limit thereof is generally 20 μmol, preferably 10 mmol, more preferably 3 μmol, especially preferably 1.5 μmol, in particular 1.0 μmol.

In the case where the amount of the catalyst is too small, the rate of polymerization is too low. As a result, a higher polymerization temperature must be used in order to obtain a polycarbonate resin having a desired molecular weight, and the polycarbonate resin thus obtained has an impaired hue and impaired light resistance. In addition, there is a possibility that an unreacted starting material might volatilize during the polymerization to change the molar proportions of the one or more dihydroxy compounds including the dihydroxy compound according to the invention and of the carbonic diester represented by the general formula (2) and a desired molecular weight might not be reached. On the other hand, in the case where the polymerization catalyst is used in too large an amount, there is a possibility that the resultant polycarbonate resin might have an impaired hue and impaired light resistance.

In the case where diphenyl carbonate or a substituted diphenyl carbonate, e.g., ditolyl carbonate, is used as a carbonic diester represented by the general formula (2) to produce a polycarbonate resin according to the invention, phenol or a substituted phenol generates as a by-product and unavoidably remains in the polycarbonate resin and comes into the polycarbonate resin composition. However, since phenol and the substituted phenol also have an aromatic ring, there are the cases where not only these compounds absorb ultraviolet rays to serve as a factor contributing to a deterioration in light resistance but also the compounds are causative of an odor during molding. After an ordinary batch reaction, the polycarbonate resin contains an aromatic monohydroxy compound having an aromatic ring, e.g., by-product phenol, in an amount of 1,000 weight ppm or more. From the standpoints of light resistance and odor diminution, it is preferred to reduce the content of the aromatic monohydroxy compound in the polycarbonate resin composition to 700 weight ppm or less, preferably 500 weight ppm or less, especially 300 weight ppm or less, using a horizontal reactor having excellent volatilizing performance or using an extruder having a vacuum vent. It is, however, noted that it is difficult to industrially completely remove the aromatic monohydroxy compound, and the lower limit of the content thereof is generally 1 weight ppm.

Those aromatic monohydroxy compounds may, of course, have substituents, depending on the starting materials used. For example, the compounds may have an alkyl group having up to 5 carbon atoms or the like.

There is a possibility that when Group-1 metals, especially sodium, potassium, and cesium, in particular, lithium, sodium, potassium, and cesium, are contained in the polycarbonate resin in a large amount, these metals might adversely affect the hue. These metals do not come only from the catalyst used but may come from starting materials and the reactor. Consequently, the total amount of compounds of those metals in the polycarbonate resin is generally 1 weight ppm or less, preferably 0.8 weight ppm or less, more preferably 0.7 weight ppm or less, in terms of metal amount.

The content of metals in the polycarbonate resin can be determined by recovering the metals contained in the polycarbonate resin by a technique such as wet ashing and then determining the amount of the metals using a technique such as atomic emission, atomic absorption, or inductively coupled plasma (ICP) spectroscopy.

<Process for Production>

Although the polycarbonate resin according to the invention is obtained by condensation-polymerizing one or more dihydroxy compounds including the dihydroxy compound according to the invention with a carbonic diester represented by the general formula (2) by means of a transesterification reaction, it is preferred to evenly mix the starting materials, i.e., the dihydroxy compounds and the carbonic diester, prior to the transesterification reaction.

The temperature at which the starting materials are mixed together is generally 80° C. or higher, preferably 90° C. or higher, and the upper limit thereof is generally 250° C. or lower, preferably 200° C. or lower, more preferably 150° C. or lower. Especially suitable is a temperature of 100-120° C. In the case where the mixing temperature is too low, there is a possibility that the starting materials might show a low dissolution rate and insufficient solubility, often resulting in troubles such as solidification. Too high mixing temperatures may result in the cases where the dihydroxy compounds deteriorate thermally. As a result, there is a possibility that the polycarbonate resin obtained might have an impaired hue, which adversely affects light resistance.

It is preferred from the standpoint of preventing hue deterioration that an operation for mixing the dihydroxy compounds including the dihydroxy compound according to the invention and the carbonic diester represented by the general formula (2), which are starting materials for the polycarbonate resin according to the invention, should be conducted in an atmosphere having an oxygen concentration of 10% by volume or less, desirably 0.0001-10% by volume, especially 0.0001-5% by volume, in particular 0.0001-1% by volume.

It is preferred that for obtaining the polycarbonate resin according to the invention, the carbonic diester represented by the general formula (2) should be used in such an amount that the molar proportion thereof to the dihydroxy compounds to be subjected to the reaction which include the dihydroxy compound according to the invention is 0.90-1.20. The molar proportion thereof is more preferably 0.95-1.10.

In the case where the molar proportion thereof is too low, there is a possibility that the polycarbonate resin produced might have an increased amount of terminal hydroxyl groups and this polymer might have impaired thermal stability and take a color upon molding. There also is a possibility that the rate of transesterification reaction might decrease or a desired high-molecular polymer might not be obtained.

When the molar proportion thereof is too high, there are the cases where the rate of transesterification reaction decreases or it is difficult to produce a polycarbonate having a desired molecular weight. The decrease in the rate of transesterification reaction enhances heat history during the polymerization reaction, resulting in a possibility that the enhanced heat history might impair the hue and light resistance of the polycarbonate resin obtained.

Furthermore, when the molar proportion of the carbonic diester represented by the general formula (2) to the dihydroxy compounds including the dihydroxy compound according to the invention is too high, the polycarbonate resin obtained has an increased content of the residual carbonic diester and the polycarbonate resin composition also has an increased carbonic diester content. There are the cases where the residual carbonic diester absorbs ultraviolet rays to impair the light resistance of the polycarbonate resin composition. Such too high proportions of the carbonic diester are hence undesirable. The concentration of the carbonic diester in the polycarbonate resin composition of the invention is preferably 60 weight ppm or less, more preferably 40 weight ppm or less, especially preferably 30 weight ppm or less. Actually, the polycarbonate resin composition may contain unreacted carbonic diesters. A lower limit of the concentration thereof is generally 1 weight ppm.

In the invention, a process in which the dihydroxy compounds are condensation-polymerized with the carbonic diester is conducted in the presence of the catalyst described above usually in multiple stages using a plurality of reactors. The mode of reaction operation may be any of the batch type, the continuous type, and a combination of the batch type and the continuous type.

It is preferred that in the initial stage of the polymerization, the polymerization should be conducted at a relatively low temperature and under relatively low vacuum to obtain a prepolymer, and that in the late stage of the polymerization, the polymerization should be conducted at a relatively high temperature under relatively high vacuum to heighten the molecular weight to a given value. It is, however, important from the standpoints of hue and light resistance that a jacket temperature, an internal temperature, and an internal pressure of the system should be suitably selected for each molecular-weight stage. For example, in the case where either temperature or pressure is changed before the polymerization reaction reaches a given value, an unreacted monomer is distilled off to change the molar ratio of the dihydroxy compounds to the carbonic diester. This may result in a decrease in polymerization rate or make it impossible to obtain a polymer having a given molecular weight or having given end groups. There hence is a possibility that the objects of the invention cannot finally be accomplished.

To provide a polymerizer with a reflux condenser is effective for inhibiting the monomers from being distilled off. This effect is high especially in the reactor for the initial stage of polymerization, in which the amount of unreacted monomer ingredients is large. The temperature of the coolant which is being introduced into the reflux condenser can be suitably selected according to the monomers used. However, the temperature of the coolant being introduced into the reflux condenser, as measured at the inlet of the reflux condenser, is generally 45-180° C., preferably 80-150° C., especially preferably 100-130° C. In the case where the temperature of the coolant being introduced into the reflux condenser is too high, the amount of the monomers being refluxed decreases, resulting in a decrease in the effect of the refluxing. In the case where the temperature thereof is too low, the efficiency of the removal by distillation of the monohydroxy compound to be removed by distillation tends to decrease. As the coolant, use may be made of hot water, steam, a heat-medium oil, or the like. Preferred is steam or a heat-medium oil.

The selection of the kind and amount of a catalyst described above is important for maintaining a suitable polymerization rate and inhibiting the monomers from being distilled off and for simultaneously enabling the finally obtained polycarbonate resin composition to have intact properties such as hue, thermal stability, and light resistance.

It is preferred that the polycarbonate resin according to the invention should be produced by polymerizing the starting materials in multiple stages using a catalyst and a plurality of reactors. The reasons why the polymerization is conducted in a plurality of reactors are that in the initial stage of the polymerization reaction, since the monomers are contained in a large amount in the liquid reaction mixture, it is important that the monomers should be inhibited from volatilizing off while maintaining a necessary polymerization rate, and that in the late stage of the polymerization reaction, it is important to sufficiently remove by distillation the by-product monohydroxy compound in order to shift the equilibrium to the polymerization side. For thus setting different sets of polymerization reaction conditions, it is preferred to use a plurality of polymerizers arranged serially, from the standpoint of production efficiency.

The number of reactors to be used in the process of the invention is not limited so long as the number thereof is at least 2 as described above. From the standpoints of production efficiency, etc., the number thereof is 3 or more, preferably 3-5, especially preferably 4.

In the invention, the process may be conducted in various manners so long as two or more reactors are used. For example, a plurality of reaction stages differing in conditions are formed in any of the reactors, or the temperature and the pressure may be continuously changed in any of the reactors.

In the invention, the polymerization catalyst can be introduced into a starting-material preparation tank or a starting-material storage tank, or can be introduced directly into a polymerization vessel. However, from the standpoints of stability of feeding and polymerization control, a catalyst supply line is disposed somewhere in a starting-material line before a polymerization vessel, and the catalyst is supplied preferably in the form of an aqueous solution.

With respect to polymerization reaction temperature, too low temperatures result in a decrease in productivity and cause the product to undergo an enhanced heat history. Too high temperatures not only result in monomer volatilization but also result in the possibility of enhancing degradation and coloring of the polycarbonate resin.

Specifically, the reaction in the first stage may be conducted at a temperature of 140-270° C., preferably 180-240° C., more preferably 200-230° C., in terms of the maximum internal temperature of the polymerizer, and a pressure of 110-1 kPa, preferably 70-5 kPa, more preferably 30-10 kPa (absolute pressure) for 0.1-10 hours, preferably 0.5-3 hours, while the monohydroxy compound which generates is being removed from the reaction system by distillation.

In the second and any succeeding stages, the pressure of the reaction system is gradually lowered from the pressure used in the first stage, and the polymerization is conducted while the monohydroxy compound which generates is being continuously removed from the reaction system. Finally, the pressure (absolute pressure) of the reaction system is lowered to 200 Pa or below. The second and any succeeding stages are thus conducted at a maximum internal temperature of 210-270° C., preferably 220-250° C., for a period of generally 0.1-10 hours, preferably 1-6 hours, especially preferably 0.5-3 hours.

Especially from the standpoints of inhibiting the polycarbonate resin from taking a color or deteriorating thermally and of thereby obtaining the polycarbonate resin having a satisfactory hue and satisfactory light resistance, it is preferred that the maximum internal temperature in all reaction stages should be lower than 250° C., in particular 225-245° C. From the standpoints of inhibiting the rate of polymerization from decreasing in the latter half of the polymerization reaction and of thereby minimizing the deterioration caused by heat history, it is preferred to use, in the final stage of the polymerization, a horizontal reactor having excellent plug flow characteristics and interface renewal characteristics.

In the case where the polymerization is conducted at too high a temperature or for too long a period in order to obtain a polycarbonate resin having a given molecular weight, there is a tendency that the resultant polycarbonate resin has a reduced ultraviolet transmittance and an increased YI value.

From the standpoint of effective utilization of resources, it is preferred that the monohydroxy compound which generated as a by-product should be reused as a starting material for diphenyl carbonate, bisphenol A, or the like after purified according to need.

The polycarbonate resin according to the invention, after having been obtained through polycondensation as described above, is usually solidified by cooling and pelletized with a rotary cutter or the like.

Methods for the pelletization are not limited. Examples thereof include: a method in which the polycarbonate resin is discharged in a molten state from the final polymerizer, cooled and solidified in a strand form, and pelletized; a method in which the resin is fed in a molten state from the final polymerizer to a single- or twin-screw extruder, melt-extruded, subsequently cooled and solidified, and pelletized; and a method which includes discharging the resin in a molten state from the final polymerizer, cooling and solidifying the resin in a strand form, temporarily pelletizing the resin, thereafter feeding the resin to a single- or twin-screw extruder again, melt-extruding the resin, and then cooling, solidifying, and pelletizing the resin.

During such operations, residual monomers can be removed by volatilization under vacuum within the extruder. It is also possible to add generally known additives such as a heat stabilizer, neutralizing agent, light resistance improver, release agent, colorant, antistatic agent, slip agent, lubricant, plasticizer, compatibilizing agent, and flame retardant and knead the mixture within the extruder.

The temperature to be used for melt kneading in the extruder depends on the glass transition temperature and molecular weight of the polycarbonate resin. However, the melt kneading temperature is generally 150-300° C., preferably 200-270° C., more preferably 230-260° C. In the case where the melt kneading temperature is lower than 150° C., the polycarbonate resin has a high melt viscosity and imposes an increased load on the extruder, resulting in a decrease in productivity. In the case where the melt kneading temperature is higher than 300° C., the polycarbonate thermally deteriorates considerably, resulting in a decrease in mechanical strength due to the decrease in molecular weight and further resulting in coloring and gas evolution.

When the polycarbonate resin according to the invention is produced, it is desirable to dispose a filter in order to prevent inclusion of foreign matter. The position where a filter is disposed preferably is on the downstream side of the extruder. The rejection size (opening size) of the filter is preferably 100 μm or smaller in terms of 99% removal filtration accuracy. Especially when the resin is for use in film applications or the like for which inclusion of minute foreign particles should be avoided, the opening size of the filter is preferably 40 μm or smaller, more preferably 10 μm or smaller.

From the standpoint of preventing inclusion of foreign matter from occurring after extrusion, it is desirable that the polycarbonate resin according to the invention should be extruded in a clean room having a cleanliness preferably higher than class 7 defined in JIS B 9920 (2002), more preferably higher than class 6.

Furthermore, for cooling and pelletizing the extruded polycarbonate resin, it is preferred to use a cooling method such as air cooling or water cooling. It is desirable that air from which airborne foreign matter has been removed beforehand with a high-efficiency particulate air filter or the like should be used for the air cooling to prevent airborne foreign matter from adhering again. In the case of conducting water cooling, it is desirable to use water from which metallic substances have been removed with an ion-exchange resin or the like and from which foreign matter has been removed with a filter. It is preferred that the filter to be used should have an opening size of 10-0.45 μm in terms of 99% removal filtration accuracy.

The molecular weight of the thus-obtained polycarbonate resin according to the invention can be expressed in terms of reduced viscosity. The reduced viscosity thereof is generally 0.30 dL/g or higher, preferably 0.35 dL/g or higher. The upper limit of the reduced viscosity thereof may be 1.20 dL/g or less and is more preferably 1.00 dL/g or less, even more preferably 0.80 dL/g or less. In the case where the reduced viscosity of the polycarbonate resin is too low, there is a possibility that this polycarbonate resin might give molded articles having low mechanical strength. In the case where the reduced viscosity thereof is too high, this polycarbonate resin tends to show reduced flowability during molding, resulting in decreases in productivity and moldability.

Incidentally, the reduced viscosity of a polycarbonate is determined by preparing a solution thereof having a concentration precisely adjusted to 0.6 g/dL using methylene chloride as a solvent and measuring the viscosity of the solution with an Ubbelohde viscometer at a temperature of 20.0±0.1° C.

The lower limit of the concentration of the end group represented by the following general formula (3) (concentration of terminal phenyl groups) in the polycarbonate resin according to the invention is preferably 20 μeq/g, more preferably 40 μeq/g, especially preferably 50 μeq/g. The upper limit thereof is preferably 160 μeq/g, more preferably 140 μeq/g, especially preferably 100 μeq/g.

In the case where the concentration of the end group represented by the following general formula (3) is too high, there is a possibility that even when the polycarbonate resin has a satisfactory hue immediately after polymerization or during molding, the high end group concentration might result in a hue deterioration through exposure to ultraviolet rays. Conversely, in the case where the concentration thereof is too low, there is a possibility that this polycarbonate resin might have reduced thermal stability.

Examples of methods for regulating the concentration of the end group represented by the following general formula (3) include: to regulate the molar proportions of the starting materials, i.e., one or more dihydroxy compounds including the dihydroxy compound according to the invention and a carbonic diester represented by the general formula (2); and to control factors during the transesterification reaction, such as the kind and amount of a catalyst, polymerization pressure, and polymerization temperature.

[Chem. 13]

(3)

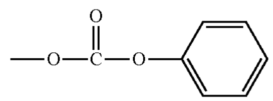

When the number of moles of the H bonded to the aromatic rings of the polycarbonate resin according to the invention is expressed by A and the number of moles of the H bonded to the part other than the aromatic rings is expressed by B, then the proportion of the number of moles of the H bonded to the aromatic rings to the number of moles of all H is expressed by A/(A+B). Since there is a possibility that the aromatic rings, which have ultraviolet-absorbing ability, might affect light resistance as stated above, it is preferred that A/(A+B) should be 0.05 or less, more preferably 0.04 or less, even more preferably 0.02 or less, especially preferably 0.01 or less. The value of A/(A+B) can be determined by $^{1}H$ NMR spectroscopy.

(3) Polycarbonate Resin Composition

<Light Resistance Improver>

A light resistance improver can be incorporated into the polycarbonate resin composition of the invention so long as the incorporation thereof does not defeat the objects of the invention. By incorporating a light resistance improver into the polycarbonate resin composition, the difference in haze between before and after the irradiation treatment with a sunshine carbon arc lamp can be reduced and a polycarbonate resin molded article which is not opaque and has excellent transparency can be obtained. The content of the light resistance improver, per 100 parts by weight of the polycarbonate resin, is preferably 0.0001-1 part by weight, more preferably 0.001-0.8 parts by weight, even more preferably 0.005-0.5 parts by weight, especially preferably 0.01-0.3 parts by weight, most preferably 0.05-0.15 parts by weight. In the case where the content of the light resistance improver is too high, the polycarbonate resin composition tends to take a color. On the other hand, in the case where the content thereof is too low, there is a tendency that the effect of bringing about a sufficient improvement in weatherability tests is not obtained. A light resistance improver is an agent which functions to prevent resin deterioration caused by light that mainly is ultraviolet rays and the like and to thereby improve stability to light. Examples of the light resistance improver include stabilizers which absorb light such as ultraviolet rays and release the energy thereof as energy that does not contribute to polymer degradation, such as, for example, heat energy. Specific examples thereof include ultraviolet absorbers, which absorb ultraviolet rays themselves, and light stabilizers which have the function of trapping radicals.

Preferred light stabilizers for use in the invention among these are basic compounds. More preferred are amine compounds. It is known that polycarbonate resins usually are unstable to basic ingredients, e.g., alkalis, even at ordinary temperature, and it is known that polycarbonate resin are hydrolyzed also by amine compounds. In the case of the polycarbonate resin to be used in the invention, however, by incorporating basic compounds thereinto, the stability to light, e.g., ultraviolet rays, is greatly improved, far from being impaired, and the resin is highly inhibited from suffering deteriorations such as hydrolysis. This effect is further enhanced when amine compounds are used.

Preferred of these are amine compounds which have a structure that includes a cyclic structure including a nitrogen atom as part thereof. More preferred are amine compounds having a piperidine structure. The piperidine structure herein may be any structure so long as the structure is a saturated, 6-membered, cyclic amine structure, and may be a piperidine structure partly substituted with one or more substituents. Examples of the substituents which may be possessed by the piperidine structure include alkyl groups having up to 6 carbon atoms. It is more preferred to use alkyl groups having up to 4 carbon atoms. Especially preferred is methyl. Also preferred are amine compounds each having a plurality of piperidine structures. In the case of such compounds having a plurality of piperidine structures, the compounds each preferably are one in which the piperidine structures have been bonded to each other through an ester structure. Especially preferred is the compound represented by the following formula (7).

[Chem. 14]

(7)

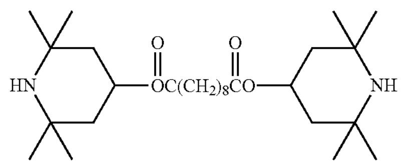

<Release Agent>

It is preferred that the polycarbonate resin composition of the invention should further contain a release agent from the standpoint that the composition shows further improved releasability from the mold during melt molding. Examples of the release agent include higher fatty acids, higher fatty acid esters of mono- or polyhydric alcohols, natural animal waxes such as bees wax, natural vegetable waxes such as carnauba wax, natural petroleum waxes such as paraffin wax, natural coal waxes such as montan wax, olefin waxes, silicone oils, and organopolysiloxanes. Especially preferred are higher fatty acids and higher fatty acid esters of mono- or polyhydric alcohols.

The higher fatty acid esters preferably are partial or complete esters of substituted or unsubstituted, mono- or polyhydric alcohols having 1-20 carbon atoms with substituted or unsubstituted, saturated fatty acids having 10-30 carbon atoms. Examples of the partial or complete esters of mono- or polyhydric alcohols with saturated fatty acids include stearic monoglyceride, stearic diglyceride, stearic triglyceride, stearic acid monosorbitate, stearyl stearate, behenic monoglyceride, behenyl behenate, pentaerythritol monostearate, pentaerythritol tetrastearate, pentaerythritol tetrapelargonate, propylene glycol monostearate, stearyl stearate, palmityl palmitate, butyl stearate, methyl laurate, isopropyl palmitate, biphenyl biphenate, sorbitan monostearate, and 2-ethylhexyl stearate. Preferred of these are stearic monoglyceride, stearic triglyceride, pentaerythritol tetrastearate, and behenyl behenate.

The higher fatty acids preferably are substituted or unsubstituted, saturated fatty acids having 10-30 carbon atoms. Examples of such saturated fatty acids include myristic acid, lauric acid, palmitic acid, stearic acid, and behenic acid. One of these release agents may be used alone, or a mixture of two or more thereof may be used. The content of the release agent, per 100 parts by weight of the polycarbonate resin, is preferably 0.0001 part by weight or higher, more preferably 0.01 part by weight or higher, especially preferably 0.1 part by weight or higher, and is preferably 1 part by weight or less, more preferably 0.7 parts by weight or less, especially preferably 0.5 parts by weight or less.

The time at which the release agent is to be incorporated into the polycarbonate resin in this embodiment and methods for the addition are not particularly limited. Examples of the time of addition include the time when polymerization reaction is completed, in the case where the polycarbonate resin was produced by a transesterification method. Examples thereof further include, regardless of polymerization method: the time when the polycarbonate resin is in a molten state, for example, during kneading of the polycarbonate resin and other ingredients; and the time when the solid-state polycarbonate resin in the form of pellets, powder, or the like is blended with other ingredients and kneaded by means of an extruder or the like. Examples of addition methods include: a method in which the release agent is directly added, through mixing or kneading, to the polycarbonate resin; and a method in which the release agent is added in the form of a high-concentration master batch produced using a small amount of the polycarbonate resin, another resin, etc. and the release agent.

<Antioxidant>

The polycarbonate resin composition of the invention may contain an antioxidant. Examples of the antioxidant include phosphite antioxidants and phenolic antioxidants.

(Phosphite Antioxidant)

Examples of the phosphite antioxidants include triphenyl phosphite, tris(nonylphenyl)phosphite, tris(2,4-di-tert-butylphenyl)phosphite, tridecyl phosphite, trioctyl phosphite, trioctadecyl phosphite, didecyl monophenyl phosphite, dioctyl monophenyl phosphite, diisopropyl monophenyl phosphite, monobutyl diphenyl phosphite, monodecyl diphenyl phosphite, monooctyl diphenyl phosphite, bis(2,6-di-tert-butyl-4-methylphenyl)pentaerythritol diphosphite, 2,2-methylenebis(4,6-di-tert-butylphenyl)octyl phosphite, bis(nonylphenyl)pentaerythritol diphosphite, bis(2,4-di-tert-butylphenyl)pentaerythritol diphosphite, and distearyl pentaerythritol diphosphite.

Preferred of these are trisnonylphenyl phosphite, trimethyl phosphate, tris(2,4-di-tert-butylphenyl)phosphite, bis(2,4-di-tert-butylphenyl)pentaerythritol diphosphite, and bis(2,6-di-tert-butyl-4-methylphenyl)pentaerythritol diphosphite. These compounds can be used alone or in combination of two or more thereof.

The content of the phosphite antioxidant, per 100 parts by weight of the polycarbonate resin, is preferably 0.0001 part by weight or higher, more preferably 0.0002 parts by weight or higher, especially preferably 0.0003 parts by weight or higher, and is preferably 1 part by weight or less, more preferably 0.1 part by weight or less, especially preferably 0.01 part by weight or less.

When the content thereof is too low, there are the cases where the effect of inhibiting the polycarbonate resin composition from taking a color upon molding is insufficient. In the case where the content thereof is too high, there is a possibility that injection molding might result in an increased amount of a mold deposit or that film formation by extrusion molding might result in an increased amount of a roll deposit, leading to an impaired surface appearance of the product.

(Phenolic Antioxidant)

It is preferred that the polycarbonate resin composition of the invention should further contain a phenolic antioxidant.

Examples of the phenolic antioxidant include compounds such as pentaerythritol tetrakis(3-mercaptopropionate), pentaerythritol tetrakis(3-laurylthiopropionate), glycerol 3-stearylthiopropionate, triethylene glycol bis[3-(3-tert-butyl-5-methyl-4-hydroxyphenyl)propionate], 1,6-hexanediol bis[3-(3,5-di-tert-butyl-4-hydroxyphenyl)propionate], pentaerythritol tetrakis[3-(3,5-di-tert-butyl-4-hydroxyphenyl)propionate], octadecyl 3-(3,5-di-tert-butyl-4-hydroxyphenyl)propionate, 1,3,5-trimethyl-2,4,6-tris(3,5-di-tert-butyl-4-hydroxybenzyl)benzene, N,N-hexamethylenebis(3,5-di-tert-butyl-4-hydroxyhydrocinnamamide), diethyl 3,5-di-tert-butyl-4-hydroxybenzylphosphonate, tris(3,5-di-tert-butyl-4-hydroxybenzyl) isocyanurate, tetrakis(2,4-di-tert-butylphenyl) 4,4'-biphenylenediphosphinate, and 3,9-bis{1,1-dimethyl-2-[β-(3-tert-butyl-4-hydroxy-5-methylphenyl)propionyloxy]ethyl}-2,4,8,10-tetraoxaspiro(5,5)undecane.

Preferred of these compounds are the aromatic monohydroxy compounds substituted with one or more alkyl groups having 5 or more carbon atoms. Specifically, the following are preferred: octadecyl 3-(3,5-di-tert-butyl-4-hydroxyphenyl)propionate, pentaerythrityl tetrakis {3-(3,5-di-t-butyl-4-hydroxyphenyl)propionate}, 1,6-hexanediol bis[3-(3,5-di-tert-butyl-4-hydroxyphenyl)propionate], 1,3,5-trimethyl-2,4,6-tris(3,5-di-tert-butyl-4-hydroxybenzyl)benzene, and the like. More preferred is pentaerythrityl tetrakis {3-(3,5-di-t-butyl-4-hydroxyphenyl)propionate}.

The content of the phenolic antioxidant, per 100 parts by weight of the polycarbonate resin, is preferably 0.0001 part by weight or higher, more preferably 0.0002 parts by weight or higher, especially preferably 0.0003 parts by weight or higher, and is preferably 1 part by weight or less, more preferably 0.1 part by weight or less, especially preferably 0.01 part by weight or less.

When the content thereof is too low, there are the cases where the effect of inhibiting the polycarbonate resin composition from taking a color upon molding is insufficient. In the case where the content thereof is too high, there is a possibility that injection molding might result in an increased amount of a mold deposit or that film formation by extrusion molding might result in an increased amount of a roll deposit, leading to an impaired surface appearance of the product.

(Sulfur-Compound Antioxidant)

Examples of sulfur-compound antioxidants include dilauryl 3,3'-thiodipropionate, ditridecyl 3,3'-thiodipropionate, dimyristyl 3,3'-thiodipropionate, distearyl 3,3'-thiodipropionate, lauryl stearyl 3,3'-thiodipropionate, pentaerythritol tetrakis(3-laurylthiopropionate), bis[2-methyl-4-(3-laurylthiopropionyloxy)-5-tert-butylphenyl]sulfide, octadecyl disulfide, mercaptobenzimidazole, 2-mercpto-6-methylbenzimidazole, and 1,1'-thiobis(2-naphthol). Preferred of these is pentaerythritol tetrakis(3-laurylthiopropionate).

The content of the sulfur-compound antioxidant, per 100 parts by weight of the polycarbonate resin, is preferably 0.0001 part by weight or higher, more preferably 0.0002 parts by weight or higher, especially preferably 0.0003 parts by weight or higher, and is preferably 1 part by weight or less, more preferably 0.1 part by weight or less, especially preferably 0.01 part by weight or less.

When the content thereof is too low, there are the cases where the effect of inhibiting the polycarbonate resin composition from taking a color upon molding is insufficient. In the case where the content thereof is too high, there is a possibility that injection molding might result in an increased amount of a mold deposit or that film formation by extrusion molding might result in an increased amount of a roll deposit, leading to an impaired surface appearance of the product.

Even when the polycarbonate resin composition of the invention contains a phosphite antioxidant alone or a sulfur-compound antioxidant alone, the effect of inhibiting coloring is poor. When the composition contains both, there is a possibility that the antioxidants might produce the effect of highly inhibiting the composition from taking a color upon molding.

<Other Additives>

(Acidic Compound)

The polycarbonate resin composition of the invention may further contain an acidic compound.

The amount of at least one acidic compound to be incorporated, per 100 parts by weight of the polycarbonate resin, is preferably 0.00001 part by weight or more, more preferably 0.0001 part by weight or more, especially preferably 0.0002 parts by weight or more, and is preferably 0.1 part by weight or less, more preferably 0.01 part by weight or less, especially preferably 0.001 part by weight or less.

When the amount of the acidic compound incorporated is too small, there are the cases where the polycarbonate resin composition cannot be sufficiently inhibited from taking a color when caused to remain in the injection molding machine for a prolonged period during injection molding. Too large incorporation amounts of the acidic compound may result in the cases where the polycarbonate resin composition has considerably reduced hydrolytic resistance.

Examples of the acidic compound include Brønsted acids and esters thereof, such as hydrochloric acid, nitric acid, boric acid, sulfuric acid, sulfurous acid, phosphoric acid, phosphorous acid, hypophosphorous acid, polyphosphoric acid, adipic acid, ascorbic acid, aspartic acid, azelaic acid, adenosine phosphate, benzoic acid, formic acid, valeric acid, citric acid, glycolic acid, glutamic acid, glutaric acid, cinnamic acid, succinic acid, acetic acid, tartaric acid, oxalic acid, p-toluenesulfinic acid, p-toluenesulfonic acid, naphthalenesulfonic acid, nicotinic acid, picric acid, picolinic acid, phthalic acid, terephthalic acid, propionic acid, benzenesulfinic acid, benzenesulfonic acid, malonic acid, and maleic acid. Preferred of these acidic compounds or derivatives thereof are sulfonic acids or esters thereof. Especially preferred of these are p-toluenesulfonic acid, methyl p-toluenesulfonate, and butyl p-toluenesulfonate.

Any of these acidic compounds can be added in a step for producing the polycarbonate resin composition as a compound for neutralizing the basic transesterification catalyst used in the polycondensation reaction for polycarbonate resin production described above.

An antistatic agent can be incorporated into the polycarbonate resin composition of the invention so long as the incorporation thereof does not defeat the objects of the invention.

(Inorganic Filler)

The polycarbonate resin composition of the invention may contain an inorganic filler. The amount of the inorganic filler to be incorporated is generally 1-100 parts by weight, preferably 3-50 parts by weight, per 100 parts by weight of the polycarbonate resin. In the case where the amount of the inorganic filler incorporated is too small, the effect of reinforcement tends to be low. In the case where the amount thereof is too large, the polycarbonate resin composition tends to have an impaired appearance.

Examples of the inorganic filler include glass fibers, milled glass fibers, glass flakes, glass beads, carbon fibers, silica, alumina, titanium oxide, calcium sulfate powder, gypsum, gypsum whiskers, barium sulfate, talc, mica, calcium silicate such as wollastonite, carbon black, graphite, iron powder, copper powder, molybdenum disulfide, silicon carbide, silicon carbide fibers, silicon nitride, silicon nitride fibers, brass fibers, stainless-steel fibers, and potassium titanate fibers and whiskers. Preferred of these are: fibrous fillers of glass, powdery fillers of glass, and flaky fillers of glass; fibrous fillers of carbon, powdery fillers of carbon, and flaky fillers of carbon; and various kinds of whiskers, mica, and talc. More preferred examples include glass fibers, glass flakes, milled glass fibers, carbon fibers, wollastonite, mica, and talc.

<Process for Producing Polycarbonate Resin Composition>

In this embodiment, the time at which the ingredients which can be incorporated into the polycarbonate resin composition, such as, for example, a light resistance improver, release agent, antioxidant, acidic compound, and inorganic filler, are to be mixed and methods for the mixing are not particularly limited. With respect to the time of mixing, the ingredients may be mixed, for example, during the polymerization reaction or at the time of completion of the polymerization reaction in the case where the polycarbonate resin is produced by a transesterification method. Regardless of polymerization method, the ingredients may be mixed, using a kneading/extruding machine or the like, when the polycarbonate resin is in a molten state, for example, during kneading of the polycarbonate resin and other compounding ingredients. Furthermore, use may be made of a method in which the solid-state polycarbonate resin in the form of pellets, powder, or the like is mixed with the compounding ingredients and this mixture is further mixed with heating.

The polycarbonate resin composition of the invention can be produced by mixing the compounding ingredients either simultaneously or in any desired order by means of a mixing machine, e.g., a tumbling mixer, twin-cylinder mixer, Nauta mixer, Banbury mixer, kneading rolls, or extruder.

With respect to mixing methods, the compounding ingredients may be directly mixed with or kneaded together with the polycarbonate resin. Alternatively, use may be made of a method in which a high-concentration master batch is produced beforehand using the compounding ingredients and a small amount of a polycarbonate resin, another resin, etc. and this master batch is mixed with the polycarbonate resin according to the invention.

Furthermore, the polycarbonate resin composition may contain additives generally used in resin compositions, such as a nucleating agent, flame retardant, impact modifier, blowing agent, and colorant, e.g., a dye or a pigment, so long as these additives do not defeat the objects of the invention.

(4) Polycarbonate Resin Molded Article

In this embodiment, the polycarbonate resin composition described above is molded to obtain a polycarbonate resin molded article. Methods of molding for obtaining the polycarbonate resin molded article are not particularly limited. However, injection molding is preferred. Since the polycarbonate resin molded article of the invention has excellent light resistance, transparency, and weatherability, the resin molded article is suitable for use in outdoor applications such as noise insulation walls for roads, arcade ceiling sheets, arcade ceiling plates, roofing materials for facilities, and wall materials for facilities. The polycarbonate resin molded article is especially suitable for use as building materials for outdoor use.

The polycarbonate resin composition of the invention can be used also as a polymer alloy obtained by kneading the composition together with one or more polymers selected, for example, from synthetic resins such as aromatic polycarbonates, aromatic polyesters, aliphatic polyesters, polyamides, polystyrene, polyolefins, acrylics, amorphous polyolefins, ABS, and AS, biodegradable resins such as poly (lactic acid) and poly(butylene succinate), and rubbers.

According to the invention, it is possible to provide a polycarbonate resin composition having excellent light resistance, transparency, hue, heat resistance, thermal stabilizer, moldability, and mechanical strength and to provide molded articles thereof.

EXAMPLES

The invention will be explained below in more detail by reference to Examples. However, the invention should not be construed as being limited by the following Examples unless the invention departs from the spirit thereof.

In the following, properties of polycarbonate resins, polycarbonate resin compositions, molded articles, etc. were evaluated by the following methods.

(1) Determination of Reduced Viscosity

A sample of a polycarbonate resin was dissolved using methylene chloride as a solvent to prepare a polycarbonate solution having a concentration of 0.6 g/dL. Using an Ubbelohde viscometer manufactured by Moritomo Rika Kogyo, a measurement was made at a temperature of 20.0±0.1° C. The relative viscosity ηrel was determined from the flow-down time of the solvent $t_0$ and the flow-down time of the solution t using the following equation.

$$\eta rel = t/t_0$$

The specific viscosity ηsp was determined from the relative viscosity using the following equation.

$$\eta sp = (\eta - \eta_0)/\eta_0 = \eta rel - 1$$

The specific viscosity was divided by the concentration c (g/dL) to determine the reduced viscosity ηsp/c. The larger the value thereof, the higher the molecular weight.

(2) Determination of Proportion of Structural Units Derived from Each Dihydroxy Compound in Polycarbonate Resin and Concentration of Terminal Phenyl Groups Therein The proportion of structural units derived from each dihydroxy compound in a polycarbonate resin was determined in the following manner. A 30-mg portion of the polycarbonate resin was weighed out and dissolved in about 0.7 mL of heavy chloroform to obtain a solution. This solution was introduced into a tube for NMR spectroscopy which had an inner diameter of 5 mm and examined for $^1H$ NMR spectrum at ordinary temperature using JNM-AL400 (resonance frequency, 400 MHz), manufactured by JEOL Ltd. The proportion of structural units derived from each dihydroxy compound was determined from the intensity ratio between the signals assigned to structural units derived from the respective dihydroxy compounds. With respect to the concentration of terminal phenyl groups, $^1H$ NMR analysis was conducted in the same manner as described above using 1,1,2,2-tetrabromoethane as an internal reference, and the concentration thereof was determined from the intensity ratio between the signal assigned to the internal reference and the signal assigned to the terminal phenyl groups.

(3) Determination of DPC (Diphenyl Carbonate) Concentration in Polycarbonate Resin Composition A 1.25-g portion of a polycarbonate resin composition sample was dissolved in 7 mL of methylene chloride to obtain a solution. Thereafter, acetone was added thereto so as to result in a total amount of 25 mL, thereby conducting reprecipitation. Subsequently, the resultant liquid was filtered through a 0.2-μm disk filter and subjected to quantitative analysis by liquid chromatography.

(4) Method of Test Piece Production

Pellets of a polycarbonate resin composition were dried at 90° C. for 10 hours in a nitrogen atmosphere. Subsequently, the dried polycarbonate resin composition pellets were fed to an injection molding machine (Type J75EII, manufactured by The Japan Steel Works, Ltd.) to form injection-molded pieces (60 mm (width)×60 mm (length)×3 mm (thickness)) under the conditions of a resin temperature of 220° C. and a molding cycle of 23 seconds.

(5) Hue Measurement

In accordance with JIS K7105 (1981), injection-molded pieces obtained in (4) above were examined for yellowness index (YI) value by the illuminant-C transmission method using a spectroscopic color-difference meter (SE2000, manufactured by Nippon Denshoku Kogyo K.K.). The smaller the YI value, the less the yellowness and the better the quality.

(6) Measurements of Total Light Transmittance and Haze

In accordance with JIS K7105 (1981), injection-molded test pieces obtained in (4) above were examined for total light transmittance and haze using a hazeometer (NDH2000, manufactured by Nippon Denshoku Kogyo K.K.) and illuminant D65.

(7) Ratio of Number of Moles of H bonded to Aromatic Rings (A) to Number of Moles of all H (A+B) (where B is the Number of Moles of H not Bonded to Aromatic Rings)

Heavy chloroform which had been mixed beforehand with tetramethylsilane (TMS) as an internal reference was examined alone for spectrum to determine a ratio of the signal of the TMS to the signal of residual H contained in the heavy chloroform. Subsequently, 30 mg of a polycarbonate resin was weighed out and dissolved in about 0.7 mL of the heavy chloroform. This solution was introduced into a tube for NMR spectroscopy which had an inner diameter of 5 mm and examined for $^1H$ NMR spectrum at ordinary temperature using JNM-AL400 (resonance frequency, 400 MHz), manufactured by JEOL Ltd. The integral of the signal of residual H contained in the heavy chloroform (the integral being determined from the integral of the signal of the TMS and from the ratio of the TMS to residual H contained in the heavy chloroform as determined above) was subtracted from the integral of a signal which appeared at 6.5-8.0 ppm in the resultant NMR chart, and the value obtained is expressed by a. On the other hand, the integral of a signal which appeared at 0.5-6.5 ppm is expressed by b. Then, $a/(a+b)=A/(A+B)$ holds. Consequently, the right side was determined.

(8) Sunshine Weatherometer Irradiation Test

Sunshine weatherometer S80, manufactured by Suga Test Instruments Co., Ltd., which employed a sunshine carbon arc illuminator (four pairs of ultralong-life carbon arc lamps) was used to irradiate a square surface of an injection-molded flat plate (60 mm (width)×60 mm (length)×3 mm (thickness)) obtained in (4) above with light for 1,200 hours at a discharge voltage of 50 V and a discharge current of 60 A in the irradiation and surface spraying (rainfall) mode under the conditions of a black panel temperature of 63° C. and a relative humidity of 50%. The period of surface spraying (rainfall) was set at 12 minutes per hour. The glass filter used was of the type A. After the irradiation treatment, the injection-molded flat plate was examined for YI and haze and further examined visually for surface cracks.

The following are the abbreviations for compounds used in the following Examples.

(Starting Materials for Polycarbonate Resins)

ISB: isosorbide (trade name, POLYSORB; manufactured by Roquette Freres)

CHDM: 1,4-cyclohexanedimethanol (manufactured by Eastman Ltd.)

DPC: diphenyl carbonate (manufactured by Mitsubishi Chemical Corp.)

(Light Resistance Improvers)

102: Seesorb 102 (benzophenone-based light resistance improver), manufactured by Shipro Kasei Kaisha, Ltd.

3638F: Cyasorb 3638F (benzoxazine-based light resistance improver), manufactured by Sun Chemical Company Ltd.

The structures of ADK STAB LA-77, Tinuvin 765, Chimassorb 944FDL, and Chimassorb 2020FDL are shown below as formulae (A), (B), (C), and (D), respectively.

[Chem. 15]

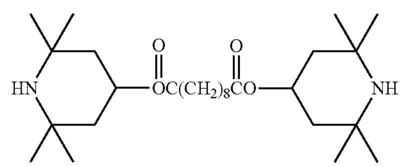

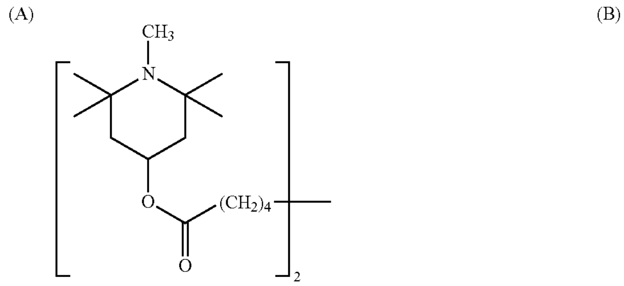

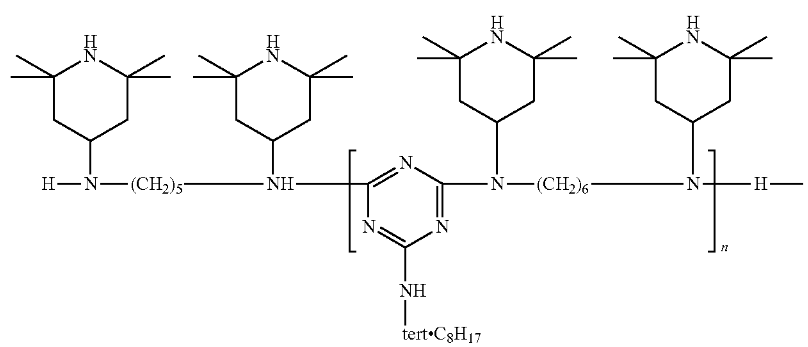

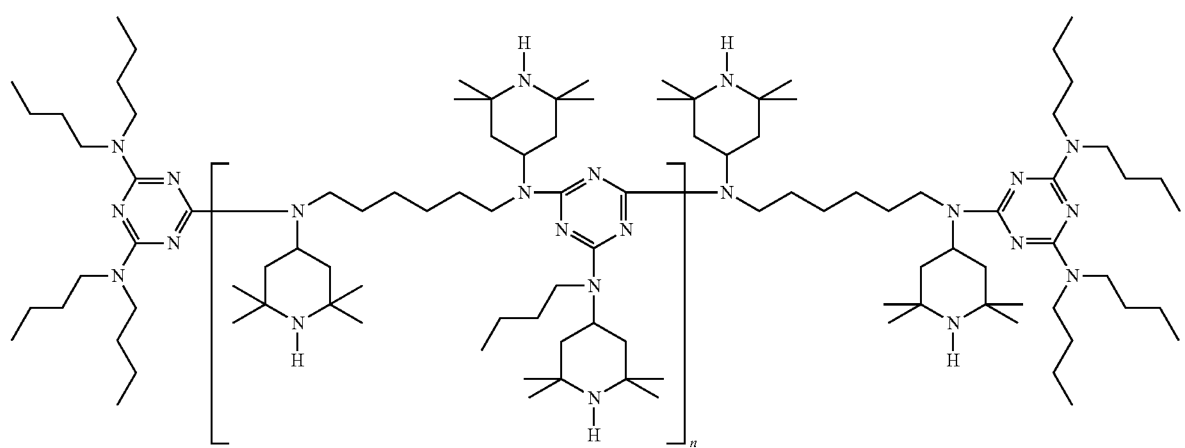

LA-77: ADK STAB LA-77 (amine-based light resistance improver), manufactured by ADEKA Corp.

765: Tinuvin 765 (amine-based light resistance improver), manufactured by BASF Japan Ltd.

944FDL: Chimassorb 944FDL (amine-based light resistance improver), manufactured by BASF Japan Ltd.

2020FDL: Chimassorb 2020FDL (amine-based light resistance improver), manufactured by BASF Japan Ltd.

LA-29: ADK STAB LA-29 (benzotriazole-based light resistance improver), manufactured by ADEKA Corp.

(Antioxidants)

2112: ADK STAB 2112 (phosphite-based antioxidant), manufactured by ADEKA Corp.

AO-60: ADK STAB AO-60 (phenolic antioxidant), manufactured by ADEKA Corp.

(Release Agent)

S-100A: stearic monoglyceride S-100A, manufactured by Riken Vitamin Co., Ltd.

Example 1

ISB, CHDM, DPC which had been purified by distillation to reduce the chloride ion concentration thereof to 10 ppb or less, and calcium acetate monohydrate were introduced in an ISB/CHDM/DPC/calcium acetate monohydrate molar ratio of 0.70/0.30/1.00/$1.3\times10^{-6}$ into a polymerizer equipped with a stirrer and a reflux condenser regulated to 100° C. Nitrogen displacement was sufficiently conducted (oxygen concentration, 0.0005-0.001% by volume). Subsequently, the contents were heated with a heat medium, and stirring was initiated at the time when the internal temperature reached 100° C. The contents were melted and homogenized while regulating the internal temperature to 100° C. Thereafter, heating was initiated, and the internal temperature was elevated to 210° C. over 40 minutes. At the time when the internal temperature reached 210° C., the polymerizer was regulated so as to maintain this temperature and pressure reduction was initiated simultaneously. The internal pressure was reduced to 13.3 kPa (absolute pressure; the same applies hereinafter) over 90 minutes from the time when 210° C. had been reached. The contents were held for further 60 minutes while maintaining that pressure. The phenol vapor which generated as a by-product with the progress of the polymerization reaction was introduced into the reflux condenser, in which steam regulated so as to have a temperature of 100° C. as measured at the inlet of the reflux condenser was used as a coolant. The monomer ingredients contained in a slight amount in the phenol vapor were returned to the polymerizer, and the phenol vapor, which remained uncondensed, was subsequently introduced into a condenser employing 45° C. warm water as a coolant and recovered.

After the internal pressure was temporarily returned to atmospheric pressure, the contents, which had been thus oligomerized, were transferred to another polymerizer equipped with a stirrer and a reflux condenser regulated in the same manner as described above. Heating and pressure reduction were initiated, and the internal temperature was elevated to 220° C. and the pressure was reduced to 200 Pa, over 60 minutes. Thereafter, the internal temperature was elevated to 230° C. and the pressure was reduced to 133 Pa or below, over 20 minutes. At the time when a given stirring power was reached, the pressure was returned to atmospheric pressure. The contents were discharged in the form of a strand and pelletized with a rotary cutter.

Using a twin-screw extruder having two vent holes (LABOTEX30HSS-32) manufactured by The Japan Steel Works, Ltd., the pellets obtained were extruded, together with ADK STAB LA-77, which is an amine compound, as a light resistance improver, S-100A as a release agent, and ADK STAB AO-60 and ADK STAB 2112 as antioxidants so as to result in the makeup shown in Table 1, into a strand form while regulating the outlet resin temperature to 250° C. The extrudate was cooled and solidified with water, and then pelletized with a rotary cutter. In this operation, the vent holes were connected to a vacuum pump, and the pressure as measured at the vent holes was regulated to 500 Pa. The results of analysis of the polycarbonate resin composition obtained and the results of evaluation thereof conducted by the methods described above are shown in Table 1.

Furthermore, the pellets obtained were introduced into a pressure cooker tester (Type PC-242, manufactured by Hirayama Manufacturing Corp.) and treated at 121° C. and a steam pressure of 0.22 MPa for 24 hours. After the test, the sample obtained was dried at 100° C. and $1.3\times10^{3}$ Pa for 5 hours to remove moisture therefrom, and then examined for viscosity-average molecular weight under the following conditions.

Viscosity-Average Molecular Weight (Mv)

An Ubbelohde viscometer was used to determine the intrinsic viscosity [η] of a 20° C. solution in methylene chloride, and the viscosity-average molecular weight (Mv) was determined using the following equation.

$$[\eta]=1.23\times10^{-4}(Mv)^{0.83}$$

The polycarbonate resin composition before the treatment had a viscosity-average molecular weight of 22,800, while the composition after the treatment had a viscosity-average molecular weight of 22,000. The decrease in molecular weight was as small as about 3%.

Example 2

A polycarbonate resin composition was obtained in the same manner as in Example 1, except that the molar ratio between ISB and CHDM in Example 1 was changed as shown in Table 1 and that the light resistance improver used in Example 1 was omitted. The polycarbonate resin composition obtained was analyzed and evaluated in the same manners as in Example 1, and the results thereof are shown in Table 1.

Example 3

A polycarbonate resin composition was obtained in the same manner as in Example 1, except that the molar ratio between ISB and CHDM in Example 1 was changed as shown in Table 1. The polycarbonate resin composition obtained was analyzed and evaluated in the same manners as in Example 1, and the results thereof are shown in Table 1.

Example 4

A polycarbonate resin composition was obtained in the same manner as in Example 3, except that the light resistance improver used in Example 3 was replaced with Tinuvin 765. The polycarbonate resin composition obtained was analyzed and evaluated in the same manners as in Example 1, and the results thereof are shown in Table 1.

Example 5

A polycarbonate resin composition was obtained in the same manner as in Example 3, except that the light resistance improver used in Example 3 was replaced with Chimassorb 944FDL. The polycarbonate resin composition obtained was analyzed and evaluated in the same manners as in Example 1, and the results thereof are shown in Table 1.

Example 6

A polycarbonate resin composition was obtained in the same manner as in Example 3, except that the light resistance improver used in Example 3 was replaced with Chimassorb 2020FDL. The polycarbonate resin composition obtained was analyzed and evaluated in the same manners as in Example 1, and the results thereof are shown in Table 1.

Comparative Example 1

A polycarbonate resin composition was obtained in the same manner as in Example 1, except that the light resistance improver used in Example 1 was omitted. The polycarbonate resin composition obtained was analyzed and evaluated in the same manners as in Example 1, and the results thereof are shown in Table 2.

Comparative Example 2

A polycarbonate resin composition was obtained in the same manner as in Example 1, except that the light resistance improver used in Example 1 was replaced with ADK STAB LA-29, which is a benzotriazole compound. The polycarbonate resin composition obtained was analyzed and evaluated in the same manners as in Example 1, and the results thereof are shown in Table 2.

Comparative Example 3

A polycarbonate resin composition was obtained in the same manner as in Example 1, except that the light resistance improver used in Example 1 was replaced with Seesorb 102, which is a benzophenone compound. The polycarbonate resin composition obtained was analyzed and evaluated in the same manners as in Example 1, and the results thereof are shown in Table 2.

Comparative Example 4

A polycarbonate resin composition was obtained in the same manner as in Example 1, except that the light resistance improver used in Example 1 was replaced with Cyasorb 3638F, which is a benzoxazine compound. The polycarbonate resin composition obtained was analyzed and evaluated in the same manners as in Example 1, and the results thereof are shown in Table 2.

Comparative Example 5

Analysis and evaluation were conducted in the same manners as in Example 1, except that a bisphenol-A polycarbonate resin (Iupilon S3000R, manufactured by Mitsubishi Engineering-Plastics Corp.) only was used as such and test pieces were produced at a resin temperature of 280° C. without using any other material. The results thereof are shown in Table 2.

Comparative Example 6

The same procedure as in Comparative Example 5 was conducted, except that use was made of 0.1 part by weight of ADK STAB LA-77, which is an amine compound, as a light resistance improver, 0.3 parts by weight of S-100A as a release agent, and 0.1 part by weight of ADK STAB AO-60 and 0.05 parts by weight of ADK STAB 2112 as antioxidants. Pellets of a bisphenol-A polycarbonate resin (Iupilon S3000R, manufactured by Mitsubishi Engineering-Plastics Corp.) were mixed with those various materials to obtain pellets of a polycarbonate resin composition.

The pellets obtained were treated with a pressure cooker tester in the same manner as in Example 1, and the viscosity-average molecular weight of the pellets which had not undergone the treatment and that of the pellets which had undergone the treatment were determined. As a result, the viscosity-average molecular weight of the composition before the treatment was 20,400, while that of the treated composition was 13,400. The decrease in viscosity-average molecular weight was about 34%. This decrease is thought to be attributable to degradation of the polycarbonate resin.

TABLE 1

Properties of polycarbonate resins, makeups of polycarbonate resin compositions, and properties of the polycarbonate resin compositions

| | | | | Example 1 | Example 2 | Example 3 | Example 4 | Example 5 | Example 6 |
|---|---|---|---|---|---|---|---|---|---|
| Polycarbonate resin | Proportion of structural units derived from dihydroxy compound | ISB | mol % | 69.9 | 50.0 | 50.0 | 50.0 | 50.0 | 50.0 |
| | | CHDM | | 30.1 | 50.0 | 50.0 | 50.0 | 50.0 | 50.0 |
| | DPC content | | ppm | 26 | 25 | 25 | 25 | 25 | 25 |
| | Reduced viscosity | | dL/g | 0.63 | 0.61 | 0.61 | 0.61 | 0.61 | 0.61 |
| | Concentration of terminal phenyl groups | | μeq/g | 75 | 77 | 77 | 77 | 77 | 77 |
| | A/(A + B) | | mol/mol | 0.007 | 0.006 | 0.006 | 0.006 | 0.006 | 0.006 |
| Light resistance improver | LA-77 (amine compound) | | parts by weight | 0.1 | | 0.1 | | | |
| | 765 (amine compound) | | parts by weight | | | | 0.1 | | |
| | 944FDL (amine compound) | | parts by weight | | | | | 0.1 | |
| | 2020FDL (amine compound) | | parts by weight | | | | | | 0.1 |
| | LA-29 (benzotriazole) | | parts by weight | | | | | | |
| | 102 (benzophenone) | | parts by weight | | | | | | |
| | 3638F (benzoxazine) | | parts by weight | | | | | | |
| Release agent | S100A | | parts by weight | 0.3 | 0.3 | 0.3 | 0.3 | 0.3 | 0.3 |
| Antioxidant | AO-60 (phenolic) | | parts by weight | 0.1 | 0.1 | 0.1 | 0.1 | 0.1 | 0.1 |
| | 2112 (phosphite) | | parts by weight | 0.05 | 0.05 | 0.05 | 0.05 | 0.05 | 0.05 |
| Molded article | Total light transmittance | | % | 91 | 91 | 91 | 91 | 91 | 91 |
| | Initial haze | | % | 0.5 | 0.8 | 0.8 | 0.49 | 0.51 | 0.51 |
| | Initial YI value | | — | 3.7 | 2.6 | 3.0 | 6.9 | 7.9 | 7.4 |
| | Haze after 1,200-hour irradiation treatment with sunshine weatherometer | | % | 3.2 | 3.9 | 3.0 | 1.3 | 1.1 | 7.3 |
| | YI value after 1,200-hour irradiation treatment with sunshine weatherometer | | — | 3.5 | 4.3 | 4.8 | 5.3 | 6.0 | 6.0 |
| | Appearance of molded article after 1,200-hour irradiation treatment with sunshine weatherometer | | — | no crack | no crack | no crack | no crack | no crack | no crack |

In the table, each blank indicates that the material was not used.

TABLE 2

Properties of polycarbonate resins, makeups of polycarbonate resin compositions, and properties of the polycarbonate resin compositions

| | | | | Comparative Example 1 | Comparative Example 2 | Comparative Example 3 | Comparative Example 4 | Comparative Example 5 |
|---|---|---|---|---|---|---|---|---|
| Polycarbonate resin | Proportion of structural units derived from dihydroxy compound | ISB | mol % | 69.9 | 69.9 | 69.9 | 69.9 | Iupilon S3000R |
| | | CHDM | | 30.1 | 30.1 | 30.1 | 30.1 | |
| | DPC content | | ppm | 26 | 26 | 26 | 26 | |
| | Reduced viscosity | | dL/g | 0.63 | 0.63 | 0.63 | 0.63 | |
| | Concentration of terminal phenyl groups | | μeq/g | 75 | 75 | 75 | 75 | |
| | A/(A + B) | | mol/mol | 0.007 | 0.007 | 0.007 | 0.007 | |
| Light resistance improver | LA-77 (amine compound) | | parts by weight | | | | | |
| | 765 (amine compound) | | parts by weight | | | | | |
| | 944FDL (amine compound) | | parts by weight | | | | | |
| | 2020FDL (amine compound) | | parts by weight | | | | | |
| | LA-29 (benzotriazole) | | parts by weight | | 0.3 | | | |
| | 102 (benzophenone) | | parts by weight | | | 0.3 | | |
| | 3638F (benzoxazine) | | parts by weight | | | | 0.3 | |
| Release agent | S100A | | parts by weight | 0.3 | 0.3 | 0.3 | 0.3 | |
| Antioxidant | AO-60 (phenolic) | | parts by weight | 0.1 | 0.1 | 0.1 | 0.1 | |
| | 2112 (phosphite) | | parts by weight | 0.05 | 0.05 | 0.05 | 0.05 | |
| Molded article | Total light transmittance | | % | 91 | 91 | 91 | 91 | 89 |
| | Initial haze | | % | 0.5 | 0.5 | 0.5 | 0.5 | 0.3 |
| | Initial YI value | | — | 3.3 | 3.5 | 5.0 | 4.4 | 1.3 |
| | Haze after 1,200-hour irradiation treatment with sunshine weatherometer | | % | 69.7 | 15.1 | 56.0 | 28.6 | 74.0 |
| | YI value after 1,200-hour irradiation treatment with sunshine weatherometer | | — | 5.0 | 5.2 | 9.8 | 11.8 | 32.0 |
| | Appearance of molded article after 1,200-hour irradiation treatment with sunshine weatherometer | | — | with crack | no crack | no crack | no crack | no cracks |

In the table, each blank indicates that the material was not used.

While the invention has been described in detail and with reference to specific embodiments thereof, it will be apparent to one skilled in the art that various changes and modifications can be made therein without departing from the spirit and scope thereof. This application is based on a Japanese patent application filed on Mar. 26, 2010 (Application No. 2010-073159), the contents thereof being incorporated herein by reference.

INDUSTRIAL APPLICABILITY

The polycarbonate resin composition of the invention not only has excellent transparency but also has satisfactory moldability, hue, heat resistance, moldability, and mechanical strength. It is hence possible to provide materials for use in a wide range of fields including the field of injection molding, such as electrical/electronic parts and automotive parts, the field of films and sheets, the field of bottles and containers for which heat resistance is necessary, lens applications such as camera lenses, finder lenses, and lenses for CCDs or CMOSs, films or sheets such as retardation films, diffusing sheets, and polarizing films which are utilized in liquid-crystal or plasma displays and the like, optical disks, optical materials, optical parts, and binder applications for fixing colorants, charge transfer agents, etc.

The invention claimed is:

1. A polycarbonate resin composition comprising:

a polycarbonate resin comprising structural units derived from dihydroxy compounds which are isosorbide and 1,4-cyclohexanedimethanol;

a release agent;

an antioxidant; and an amine compound as a light resistance improver, the polycarbonate resin composition giving a molded object having a thickness of 3 mm which has a haze, as measured in accordance with JIS K7105, of 3.2 or less after having undergone a 1,200-hour irradiation treatment with a sunshine carbon arc lamp through a type-A glass filter in accordance with JIS B7753 in an environment having a black panel temperature of 63° C., a relative humidity of 50%, and a rainfall spray period per hour of 12 minutes at a discharge voltage of 50 V and a discharge current of 60 A, wherein the proportion of the structural units derived from the isosorbide to the number of moles of all structural units derived from the dihydroxy compounds is 50 mol % or higher but 70 mol % or less, wherein the polycarbonate resin is obtained by condensation-polymerizing, by a transesterification reaction, the dihydroxy compounds with diphenyl carbonate in the presence of calcium acetate as a transesterification reaction catalyst, wherein the light resistance improver is present in an amount of 0.05-0.15 part by weight per 100 parts by weight of the polycarbonate resin, wherein the amine compound is represented by at least one formula (A), (B) or (C):

(A)

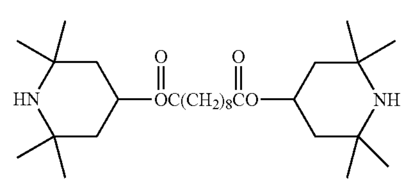

-continued (B)

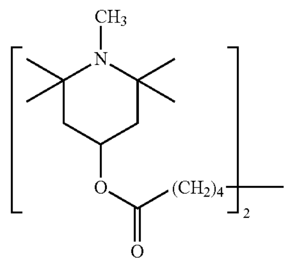

(C)

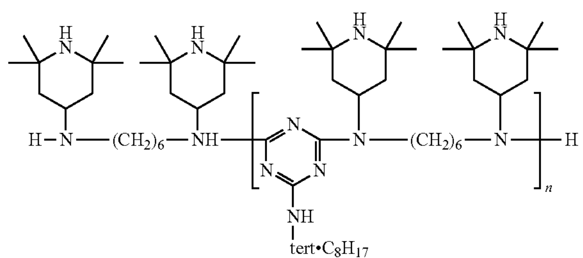

wherein a total amount of sodium, potassium and cesium in the polycarbonate resin is 1 weight ppm or less in terms of metal amount, and wherein the polycarbonate resin is produced by using the diphenyl carbonate in an amount that a molar proportion thereof to the dihydroxy compounds to be subjected to the transesterification reaction is 0.95-1.10.

2. The polycarbonate resin composition as claimed in claim 1, wherein the molded object having a thickness of 3 mm formed from the polycarbonate resin composition has a value of yellowness index (YI) of 10 or less, wherein the yellowness index (YI) is measured by: drying pellets of the polycarbonate resin composition at 90° C. for 10 hours in a nitrogen atmosphere, feeding the dried pellets to an injection molding machine to form injection-molded pieces (60 mm (width)×60 mm (length)×3 mm (thickness)) under a resin temperature of 220° C. and a molding cycle of 23 seconds, and measuring the yellowness index (YI) with a spectroscopic color-difference meter by the illuminant-C transmission method.

3. The polycarbonate resin composition as claimed in claim 1, wherein the polycarbonate resin composition contains the diphenyl carbonate in an amount of 60 weight ppm or less.

4. The polycarbonate resin composition as claimed in claim 1 which contains an aromatic monohydroxy compound in an amount of 700 weight ppm or less.

5. The polycarbonate resin composition as claimed in claim 1, wherein the polycarbonate resin contains the end group represented by the following general formula (3) in an amount in the range of 20-160 μeq/g:

(3)

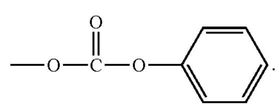

6. The polycarbonate resin composition as claimed in claim 1, wherein when the number of moles of the H bonded to the aromatic rings of the polycarbonate resin is expressed by A and the number of moles of the H bonded to the part other than the aromatic rings is expressed by B, then $A/(A+B) \leq 0.05$.

7. The polycarbonate resin composition as claimed in claim 1, wherein an amount of the release agent is 0.0001-1 part by weight per 100 parts by weight of the polycarbonate resin.

8. The polycarbonate resin composition as claimed in claim 1, wherein an amount of the antioxidant is 0.0001-1 part by weight per 100 parts by weight of the polycarbonate resin.

9. A polycarbonate resin composition comprising:

a polycarbonate resin comprising structural units derived from dihydroxy compounds which are isosorbide and 1,4-cyclohexanedimethanol;

a release agent;

an antioxidant; and a compound having a plurality of piperidine structures, the amount of the compound having a plurality of piperidine structures being 0.05-0.15 part by weight per 100 parts by weight of the polycarbonate resin, wherein the proportion of the structural units derived from the isosorbide to the number of moles of all structural units derived from the dihydroxy compounds is 50 mol % or higher but 70 mol % or less, wherein the polycarbonate resin is obtained by condensation-polymerizing, by a transesterification reaction, the dihydroxy compounds with diphenyl carbonate in the presence of calcium acetate as a transesterification reaction catalyst, wherein a total amount of sodium, potassium and cesium in the polycarbonate resin is 1 weight ppm or less in terms of metal amount, wherein the polycarbonate resin is produced by using the diphenyl carbonate in an amount that a molar proportion thereof to the dihydroxy compounds to be subjected to the transesterification reaction is 0.95-1.10, and wherein the compound having a plurality of piperidine structures is represented by at least one formula (A), (B) or (C):

(A)

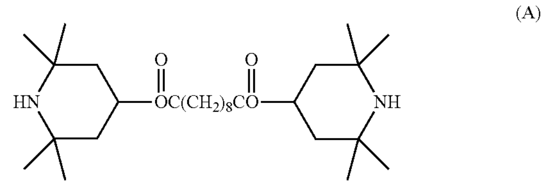

(B)

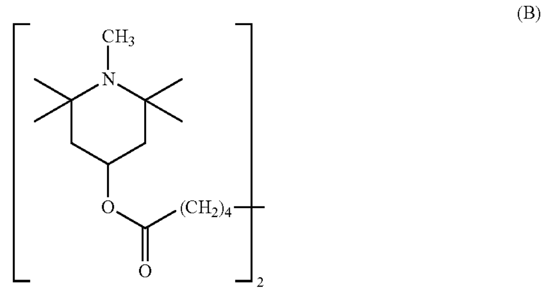

-continued (C)

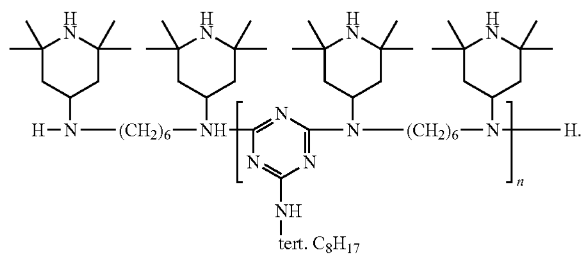

10. A polycarbonate resin molded article obtained by molding the polycarbonate resin composition according to claim 1 or claim 9.

11. The polycarbonate resin molded article as claimed in claim 10 which has been molded by injection molding.

12. A building material for outdoor use which is constituted of the polycarbonate resin molded article according to claim 10.

13. A building material for outdoor use which is constituted of the polycarbonate resin molded article according to claim 11.

14. The polycarbonate resin composition as claimed in claim 1, wherein the amine compound is represented by the following formula:

(A)

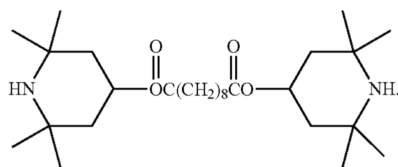

15. The polycarbonate resin composition as claimed in claim 9, wherein the compound having a plurality of piperidine structures is represented by the following formula (A):

(A)

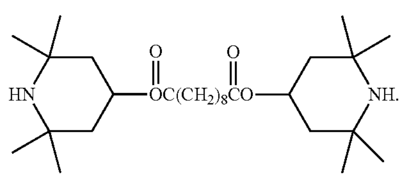

16. The polycarbonate resin composition as claimed in claim 1, wherein the reduced viscosity of the polycarbonate resin is 0.30 dL/g or more and 1.20 dL/g or less, wherein the reduced viscosity is measured by: dissolving the polycarbonate resin in methylene chloride to obtain a polycarbonate solution having a concentration of 0.6 g/dL, determining a relative viscosity ηrel by formula: $\eta rel = t/t_0$, provided that t is a flow-down time of the solution and $t_0$ is a flow-down time of a solvent of the polycarbonate solution measured using a viscometer at a temperature of 20.0±0.1° C., determining a specific viscosity ηsp by formula: $\eta sp = \eta rel - 1$, and determining the reduced viscosity by dividing the specific viscosity ηsp by the concentration c (g/dL).

17. The polycarbonate resin composition as claimed in claim 9, wherein the reduced viscosity of the polycarbonate resin is 0.30 dL/g or more and 1.20 dL/g or less, wherein the reduced viscosity is measured by: dissolving the polycarbonate resin in methylene chloride to obtain a polycarbonate solution having a concentration of 0.6 g/dL, determining a relative viscosity ηrel by formula: $\eta rel = t/t_0$, provided that t is a flow-down time of the solution and $t_0$ is a flow-down time of a solvent of the polycarbonate solution measured using a viscometer at a temperature of 20.0±0.1° C., determining a specific viscosity ηsp by formula: $\eta sp = \eta rel - 1$, and determining the reduced viscosity by dividing the specific viscosity ηsp by the concentration c (g/dL).

18. The polycarbonate resin composition as claimed in claim 9, wherein a molded object having a thickness of 3 mm formed from the polycarbonate resin composition has a value of yellowness index (YI) of 10 or less, wherein the yellowness index (YI) is measured by: drying pellets of the polycarbonate resin composition at 90° C. for 10 hours in a nitrogen atmosphere, feeding the dried pellets to an injection molding machine to form injection-molded pieces (60 mm (width)×60 mm (length)×3 mm (thickness)) under a resin temperature of 220° C. and a molding cycle of 23 seconds, and measuring the yellowness index (YI) with a spectroscopic color-difference meter by the illuminant-C transmission method.

19. The polycarbonate resin composition as claimed in claim 1, wherein an amount of the release agent is 0.0001-1 part by weight per 100 parts by weight of the polycarbonate resin, and an amount of the antioxidant is 0.0001-1 part by weight per 100 parts by weight of the polycarbonate resin.

20. The polycarbonate resin composition as claimed in claim 9, wherein an amount of the release agent is 0.0001-1 part by weight per 100 parts by weight of the polycarbonate resin, and an amount of the antioxidant is 0.0001-1 part by weight per 100 parts by weight of the polycarbonate resin.

* * * * *